(12) United States Patent
Moon

(10) Patent No.: US 7,735,237 B1
(45) Date of Patent: Jun. 15, 2010

(54) VERSATILE CALIPER MOUNTING AND MEASUREMENT ACCESSORY

(75) Inventor: Charles W. Moon, Colorado Springs, CO (US)

(73) Assignee: C.M. Engineering, LLC, Monument, CO (US)

( * ) Notice: Subject to any disclaimer, the term of this patent is extended or adjusted under 35 U.S.C. 154(b) by 99 days.

(21) Appl. No.: 12/130,226

(22) Filed: May 30, 2008

(51) Int. Cl.
*G01B 5/02* (2006.01)

(52) U.S. Cl. .................................................. 33/783

(58) Field of Classification Search ............... 33/783, 33/784, 792, 793, 794, 795, 806, DIG. 1
See application file for complete search history.

(56) References Cited

U.S. PATENT DOCUMENTS

| | | | | |
|---|---|---|---|---|
| 2,280,437 | A * | 4/1942 | Levesque | 335/295 |
| 3,826,008 | A | 7/1974 | Nishina | |
| 4,128,945 | A * | 12/1978 | Barritt | 33/501.14 |
| 4,291,465 | A | 9/1981 | Hemeyer | |
| 4,566,199 | A | 1/1986 | Gruhler et al. | |
| 4,608,759 | A | 9/1986 | Bowhay | |
| 4,731,931 | A | 3/1988 | Goodman et al. | |
| 4,873,770 | A | 10/1989 | Luttmer et al. | |
| 5,313,715 | A * | 5/1994 | Wang | 33/810 |
| 5,367,933 | A | 11/1994 | Jaksha | |
| 5,483,751 | A | 1/1996 | Kodato | |
| 5,491,907 | A | 2/1996 | Vidmar | |
| 6,009,633 | A * | 1/2000 | Novak | 33/833 |
| 6,594,915 | B2 | 7/2003 | Matsumiya et al. | |
| 6,707,360 | B2 | 3/2004 | Underwood et al. | |
| 7,245,199 | B1 | 7/2007 | Reilly | |
| 2003/0051361 | A1 * | 3/2003 | Economaki | 33/534 |

OTHER PUBLICATIONS

Mitutoyo, "Small Tool Instruments and Data Management," Mitutoyo's U.S. Catalog, 2007, pp. 125, 146-158, publisher is Mitutoyo Corp., published worldwide on Internet at http://www.mitutoyo.com/pdf/D.pdf.

Enco, "Milling Machine Accessories," Enco's Master Catalog, 2008, p. 463, publisher is Enco, published worldwide on Internet at http://www.use-enco.com/HTM/2008/img/463.png.

Fred V. Fowler Company, Inc., "Fowler Snap-Cal," Online Catalog 2304, 2008, p. 94, publisher is Fred V. Fowler Co., published worldwide on Internet at http://www.fvfowler.com/pdf/2304/2304_94.pdf.

(Continued)

*Primary Examiner*—Christopher W Fulton
(74) *Attorney, Agent, or Firm*—Eric W. Cernyar

(57) ABSTRACT

Several caliper accessories are provided that make a conventional caliper suitable for more sophisticated applications traditionally reserved for more expensive measurement devices. One of these accessories, a magnetic caliper mounting device, has a shallow scale-bar-mounting channel for receiving the scale bar of the caliper, a retainer adapted to releasably secure the scale bar of the caliper within the channel of the caliper mount, and a magnet associated with the caliper mount to secure the apparatus to a planar metal surface. Another accessory, a caliper jaw extender, is either incorporated into a magnetic caliper mounting device or provided as a spring pack accessory to a magnetic caliper mounting device. The caliper jaw extender has a spring-biased retractor that hooks onto a caliper's movable frame and biases the frame toward an extended position. Kits are also provided comprising various combinations of a conventional caliper and accessories.

21 Claims, 25 Drawing Sheets

OTHER PUBLICATIONS

McMaster-Carr, "Indicator Holders & Accessories," Online Catalog, 2008, p. 2226, publisher is McMaster-Carr, published worldwide on Internet at http://www.mcmaster.com.

Unknown Author, "Z Axis Caliper Mount for Milling Machines Z9040," date unknown, pp. 1-3. (This is the instruction manuel referenced in paragraphs 14-16 of Chuck Moon's Declaration).

* cited by examiner

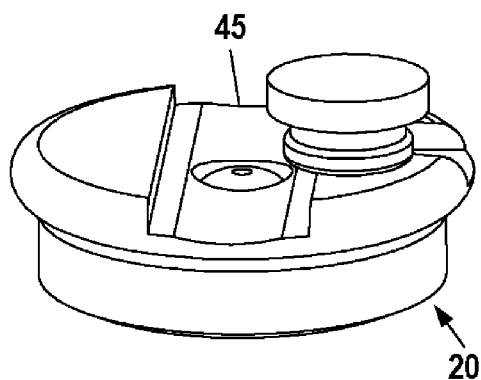
Fig. 4A
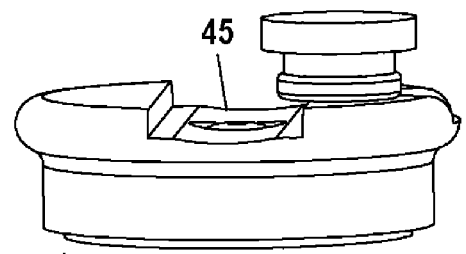
Fig. 4B
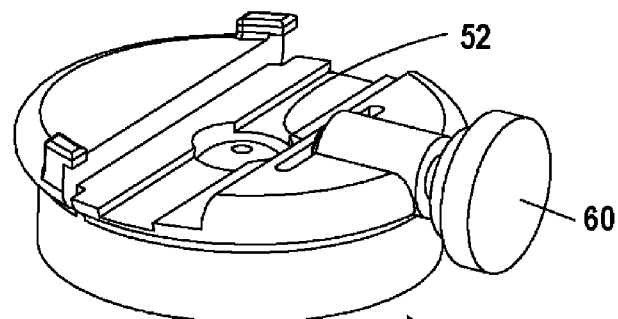
Fig. 5
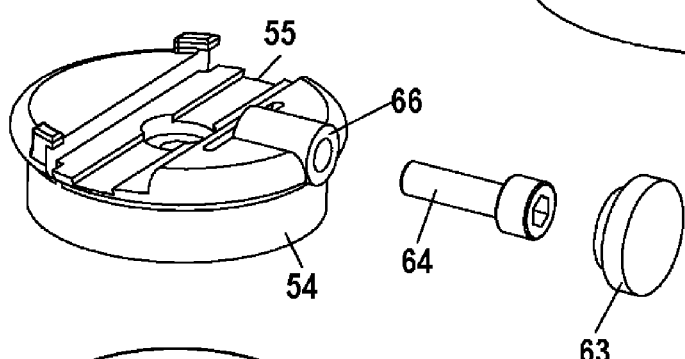
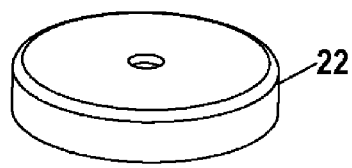
Fig. 6

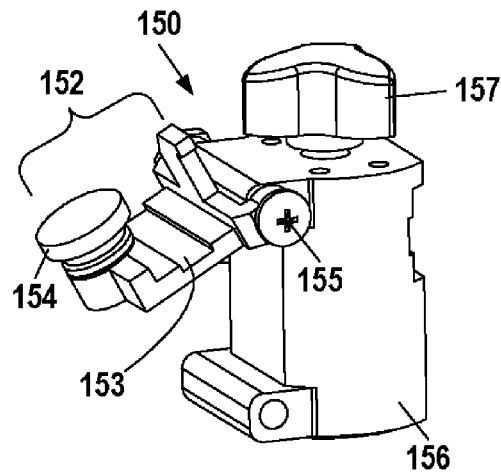
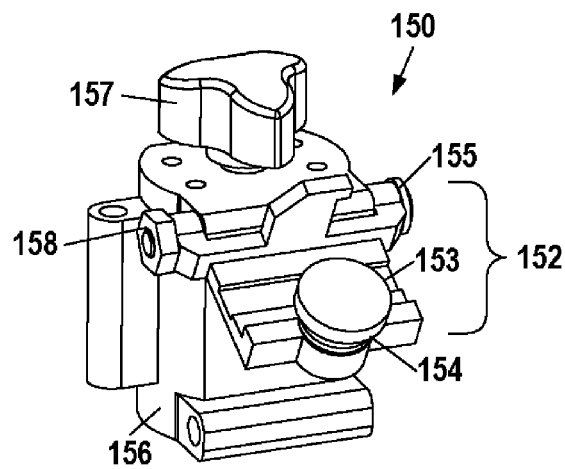
Fig. 15A  Fig. 15B
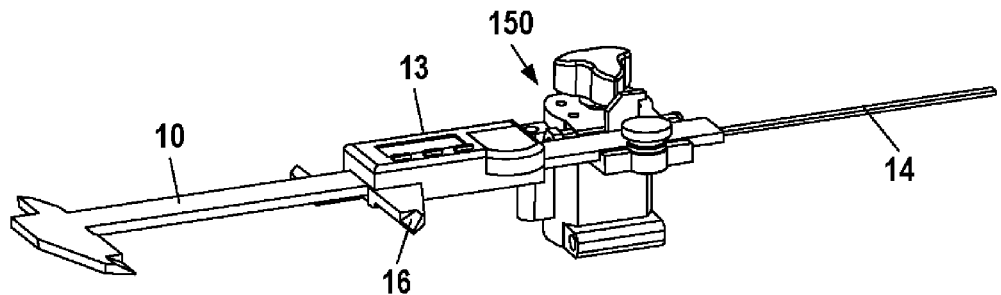
Fig. 16A
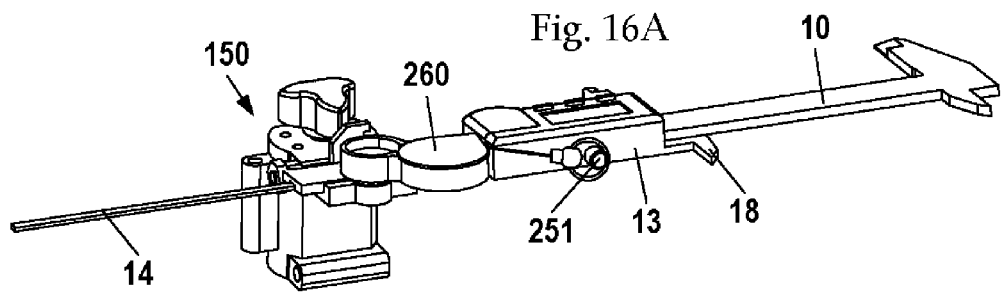
Fig. 16B

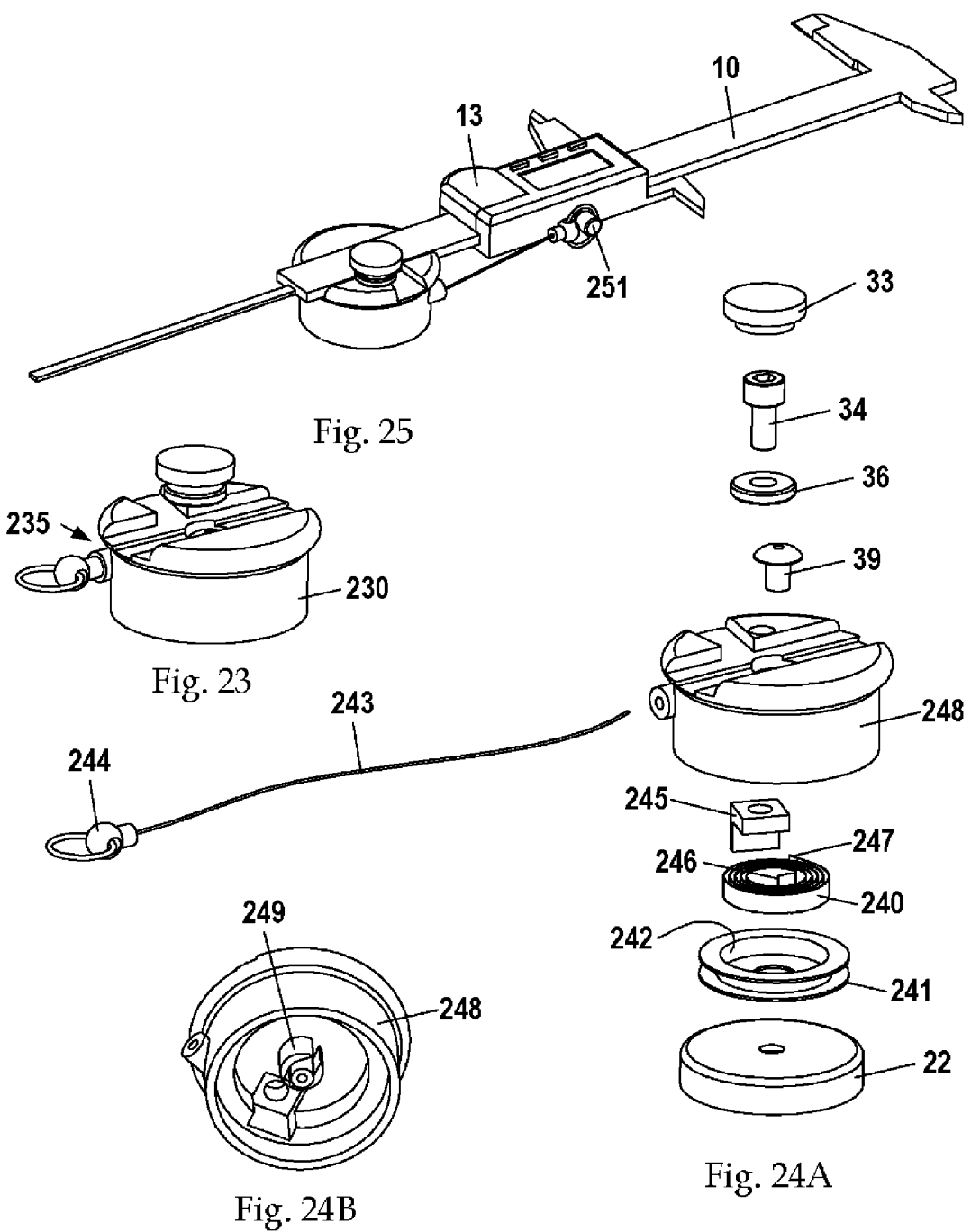

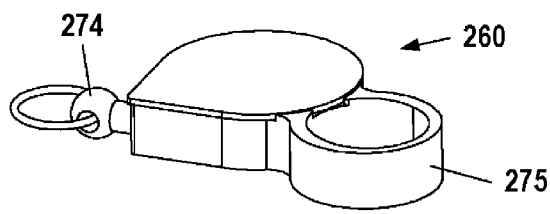
Fig. 26
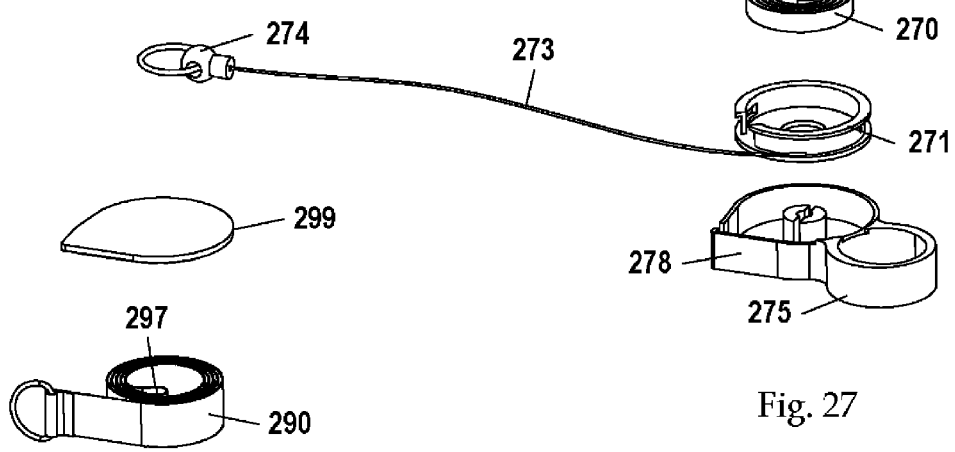
Fig. 27
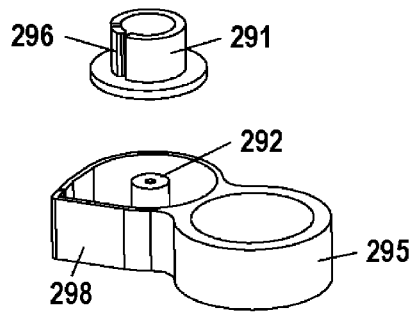
Fig. 29
Fig. 28

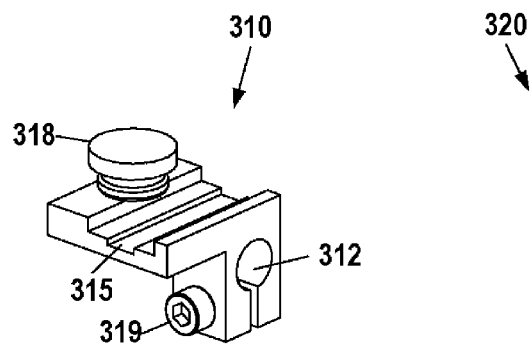
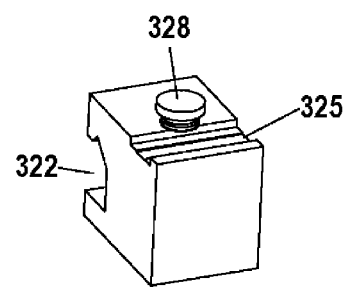
Fig. 31        Fig. 32A
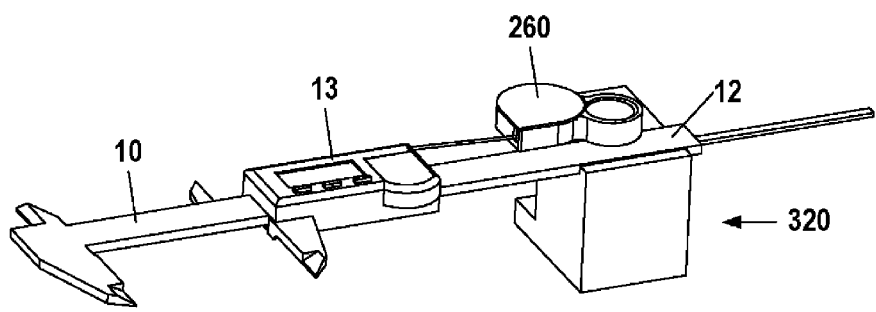
Fig. 32B

VERSATILE CALIPER MOUNTING AND MEASUREMENT ACCESSORY

FIELD OF THE INVENTION

This invention relates generally to calipers, and more specifically, to mounting devices for calipers.

BACKGROUND OF THE INVENTION

Sliding calipers are handheld tools used to very precisely measure the distance between two symmetrically opposing sides. They are frequently used in checking or inspecting dimensions of parts and/or assemblies in metal, plastic, and woodworking fields. Conventional handheld sliding calipers are relatively inexpensive, but they are not suitable for many applications, such as the positioning of a sawtable fence, a milling machine travel table or spindle, or a metal lathe carriage, top slide, or tailstock. Stated another way, conventional handheld sliding calipers are generally not suitable as a generic machine positioning device.

Typically, precise movements of machining tools such as sawtable fences, milling machine tables, and metal lathe carriages are made by recording the relative positions noted by crude markings adjacent to a hand wheel or hand crank on the machine. Alternatively, precise single-application devices, designed specifically for a sawtable, milling machine, or metal lathe and typically costing hundreds of dollars, can be obtained and installed on these machines (or in some cases are purchased with the machine).

There is a need for an inexpensive, multiple-application accessory that can adapt a conventional handheld sliding caliper for use in making precise measurements on a wide variety of wood, metal, and plastic-working machines. There is also a need for an accessory for spring-biasing the movable frame of a conventional sliding caliper for two-way positioning detection.

SUMMARY OF THE INVENTION

A simple and inexpensive accessory for a standard caliper is provided to transform a standard caliper from a parts precision measuring tool into a generic machine positioning device.

To meet the need for an accessory that makes a conventional caliper suitable for more sophisticated applications traditionally reserved for more expensive measurement devices, a magnetic caliper mounting device is provided having a shallow scale-bar-mounting channel for receiving the scale bar of the caliper, a retainer adapted to releasably secure the scale bar of the caliper within the channel of the caliper mount, and a magnet associated with the caliper mount and having a flat exposed surface operable to secure the apparatus to a planar metal surface.

The magnetic caliper mounting device mounts, via force of magnetic attraction alone, onto a flat metal surface, such as table saw top, a metal lathe carriage, or a milling machine table, and enables a conventional caliper to be used to precisely position wood-working, plastic-working, and metal-working pieces, such as the fence of a table saw fence, the table and spindle of a milling machine, and the carriage, top slide, and tailstock of a metal lathe. The magnetic caliper mounting device, when mounted on a vertical metal surface, also adapts a conventional caliper into a precise height gage.

The materials and tooling needed to manufacture the magnetic caliper mounting device are relatively inexpensive, and the magnetic caliper mounting device can be inexpensively incorporated into a kit that includes a conventional caliper.

The present invention also encompasses numerous enhancements to the basic embodiment described above. For example, some versions of the caliper mounting device include a tapered jaw mounting channel for receiving the movable jaw of a sliding caliper.

Another version of the caliper mounting device includes two orthogonally-oriented scale-bar mounting channels for facilitating measurements, using two conventional calipers, in two dimensions. Yet other versions include one or more pivotable caliper holders to orient a caliper at a desired angle around the caliper holder's axis of rotation. Yet further versions include a universal joint operable to position the caliper at any angle with respect to the planar metal surface to which the device is mounted. Some versions include a permanent disc magnet, and other, more elegant versions of the caliper mounting devices include one or more switchable magnets to facilitate removal.

To meet the need for an accessory for spring-biasing the movable frame of a conventional sliding caliper, a caliper mounting device—which may or may not be magnetically mounted—is provided having a shallow scale-bar-mounting channel for receiving the scale bar of the caliper, a retainer adapted to releasably secure the scale bar of the caliper within the channel of the caliper mount, and a caliper jaw extender. The caliper jaw extender has a spring-loaded retractor, a refractor connector adapted for connection to the movable frame of the caliper, and a spring with sufficient tension to pull the caliper's movable frame, if unobstructed and connected to the retractor, toward an extended position.

Another embodiment of the invention separates the caliper jaw extender from the caliper mounting device as a spring pack accessory. This accessory can be mounted on a basic caliper mounting device to bias a conventional caliper's movable frame toward the extended position.

Other accessories are also provided, including a caliper mounting device for the T-slot of a milling machine, a caliper mounting device for the carriage guide of a metal lathe, and a magnetically-mounted depth probe stop accessory to adapt the caliper mounting device for measuring movements of the table of a milling machine.

It is the inventor's intent that the scope of any of the claims be defined by the language of the claims, and not narrowed by reference to the embodiments described in this summary, the detailed description of the invention, or to any particular need, object, or suggested solution described in this specification. As such, the invention will be understood to encompass embodiments that meet only one of the needs, or have only one of the advantages, described above, as well as embodiments that meet various combinations of the needs and have various combinations of the advantages described above.

BRIEF DESCRIPTION OF THE DRAWINGS

FIGS. 4A-4B are perspective views of another embodiment of a magnetic caliper mounting device with a curved center slot extending along the middle of the scale bar mounting channel.

FIG. 5 is a perspective view of another embodiment of a magnetic caliper mounting device with a horizontal screw that presses against a flexible wall to secure the scale bar of a caliper.

FIG. 6 is an exploded view diagram of the components used to assemble the magnetic caliper mounting device of FIG. 5.

FIGS. 15A-15B are perspective views of another embodiment of a magnetic caliper mounting device with a switchable magnet and a pivotable caliper holder operable for mounting a caliper at any of a plurality of angular orientations around an axis parallel to the caliper mounting device's mounting surface.

FIG. 16A is a perspective view of a caliper mounted on the caliper mounting device of FIGS. 15A-15B.

FIG. 16B is a perspective view of a caliper and spring pack mounted on the caliper mounting device of FIGS. 15A-15B.

FIG. 23 is a perspective view of another embodiment of a magnetic caliper mounting device with an integrated spring for biasing the movable part of the caliper into an extended position.

FIG. 24A is an exploded view diagram of the components used to assemble the magnetic caliper mounting device of FIG. 23.

FIG. 24B is a perspective view of the bottom of the main housing of the magnetic caliper mounting device of FIG. 24A.

FIG. 25 is a perspective view of a caliper mounted in the magnetic caliper mounting device of FIG. 23.

FIG. 26 is a perspective view of a spring pack accessory operable to connect a magnetic caliper mounting device with the movable part of the caliper to bias the latter into an extended position.

FIG. 27 is an exploded view diagram of the components used to assemble the spring pack accessory of FIG. 26.

FIG. 28 is a perspective view of another embodiment of a spring pack accessory operable to connect a magnetic caliper mounting device with the movable part of the caliper to bias the latter into an extended position.

FIG. 29 is an exploded view diagram of the components used to assemble the spring pack accessory of FIG. 28.

FIG. 31 is a perspective view of an embodiment of a non-magnetic caliper mounting device configured for mounting upon a magnetic-base holder.

FIG. 32A is a perspective view of an embodiment of a non-magnetic caliper mounting device configured for mounting on the horizontal mounting bar of a metal lathe.

FIG. 32B is a perspective view of a caliper mounted in the caliper mounting device of FIG. 32A.

DETAILED DESCRIPTION

In describing preferred and alternate embodiments of the technology described herein, as illustrated in FIGS. 1A-39B, specific terminology is employed for the sake of clarity. The technology described herein, however, is not intended to be limited to the specific terminology so selected, and it is to be understood that each specific element includes all technical equivalents that operate in a similar manner to accomplish similar functions.

Figure 1A:
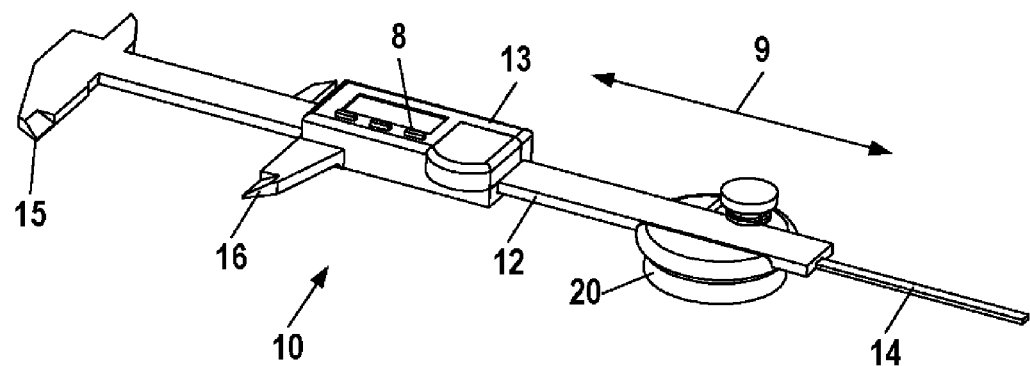
FIG. 1A is perspective view of a sliding caliper whose scale bar is mounted in the scale bar mounting channel of one embodiment of the magnetic caliper mounting device, further described in FIGS. 2A-2C.
Figure 1B:
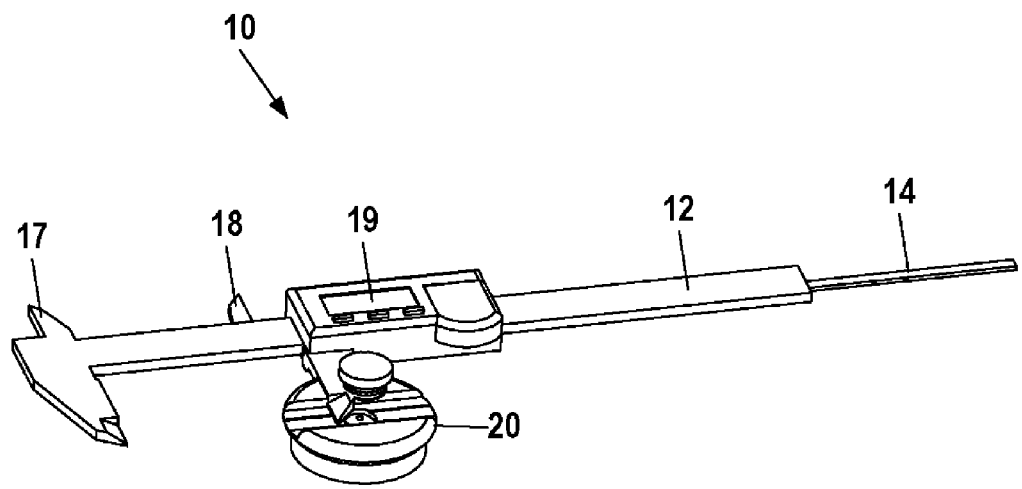
FIG. 1B is perspective view of a sliding caliper whose movable outside jaw is mounted in the tapered mounting channel of the magnetic caliper mounting device of FIGS. 2A-2C.

FIGS. 1A and 1B display a conventional sliding caliper 10 mounted in one embodiment of a magnetic caliper mounting apparatus 20. The caliper 10 comprises a scale bar 12, a movable frame 13, depth probe 14, a fixed outside jaw 15, a movable outside jaw 16, a fixed inside jaw 17, and a movable inside jaw 18. Movable outside jaw 16 and movable inside jaw 18 are rigidly connected to the movable frame 13. Depth probe 14 is also coupled to and moves synchronously with the movable frame 13. The particular caliper 10 depicted in the drawings also comprises a zero-resettable digital readout 19, in which a user can place the movable frame 13 in a desired "zero" position and press a "zero set" button 8 on the digital readout 19, so that the digital readout will indicate the precise distance the movable frame 13 is later moved from that "zero" position. A typical digital readout 19 has a resolution and accuracy of approximately 1 thousandth of an inch (~25 micrometers) or better. Other conventional calipers include dial calipers vernier calipers that incorporate a dial or vernier scale rather than (or in addition to) the digital readout 19. Most conventional calipers also have a retainer or clamping screw 251 (FIG. 25) to enable a user to block the movable part and easily transfer a measurement.

Most conventional sliding calipers 10 share some common dimensions. The scale bar 12 typically has a width of about five-eighths of an inch, and a thickness of about 1/8 of an inch. The outside jaw 16 has a straight inside edge and a tapered outside edge that tapers at an angle of about 15 degrees from the straight inside edge for most of the jaw length. The depth probe 14 is recessed within a bottom-side slot of the scale bar 12 and telescopes between retracted and extended positions.

FIGS. 2A-2C and 3 depict a basic embodiment of a magnetic caliper mounting apparatus 20 configured to mount a conventional sliding caliper 10 near and its longitudinal axis 9 parallel to a metal surface. The mounting apparatus 20 comprises a permanent disc magnet 22, a caliper mount 24, and a retainer 30 adapted to releasably secure a caliper's scale bar within a channel of the caliper mount 24. The magnet 22 has a flat exposed surface 38 for securing the apparatus 20 to a metal surface without a clamp or screw. A bolt or rivet 39 secures the caliper mount 24 to the magnet 22.

In FIGS. 2A-2C and 3, the caliper mount 24 takes the form of a molded cylindrical plastic housing having a height less than 1 inch and a diameter of about 1½ to 2½ inches, or more preferably about 1¾ inches. Other, significantly different, caliper mount embodiments are depicted in further drawings.

Caliper mount 24 includes a shallow primary channel 25 for receiving the scale bar 12 of a sliding caliper 10. The scale bar mounting channel 25 has a width 26 of approximately five-eighths of an inch, that is, slightly wider than the standard width of the scale bar 12 of a conventional sliding caliper 10. The scale bar mounting channel 25 has a depth 27 of approximately 0.110 inches, that is, slightly less than the standard thickness of the scale bar 12 of a conventional sliding caliper 10. The scale bar mounting channel 25 extends transversely between opposing channel walls 28 and 29 and longitudinally between opposite edges 31 and 32 of the caliper mount 24. FIG. 1B depicts a caliper 10 mounted within the scale bar mounting channel 25.

In FIGS. 2A-2C and 3, a shallow nested groove 35 extends longitudinally along and down the middle of scale bar mounting channel 25, and facilitates unhindered movement of the telescoping depth probe 14 of a sliding caliper 10 mounted on the caliper mount 24. The groove 35 preferably has a width of approximately one-quarter inch. In FIGS. 4A-4B and 5, a slightly wider curved recess 45 replaces the nested groove 35 and serves the same function.

The caliper mount 24 preferably also includes a tapered jaw mounting channel 21 for receiving the movable outside jaw 16 of a sliding caliper 10. Tapered jaw mounting channel 21 extends from the perimeter of the caliper mount 24 to the scale bar mounting channel 25. The width of tapered jaw mounting channel 21 tapers from a width of approximately seven-sixteenths of an inch at the perimeter of the caliper mount 24 downward, at an angle of approximately 15 degrees, to the scale bar mounting channel 25. FIG. 1B depicts a caliper 10 mounted within the tapered jaw mounting channel 21.

Figure 2A:
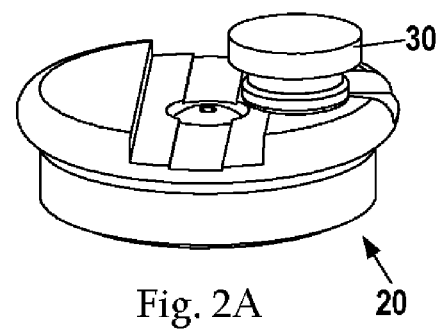
FIGS. 2A-2C are perspective views of a basic embodiment of a magnetic caliper mounting device.
Figure 2B:
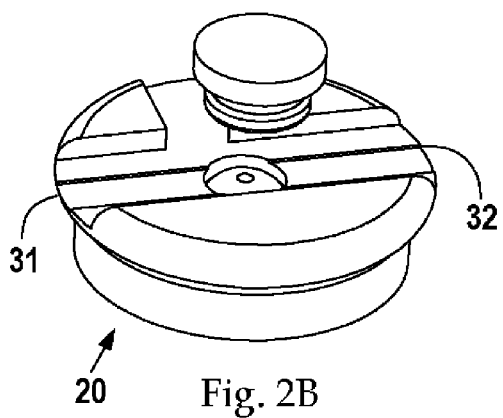
Figure 2C:
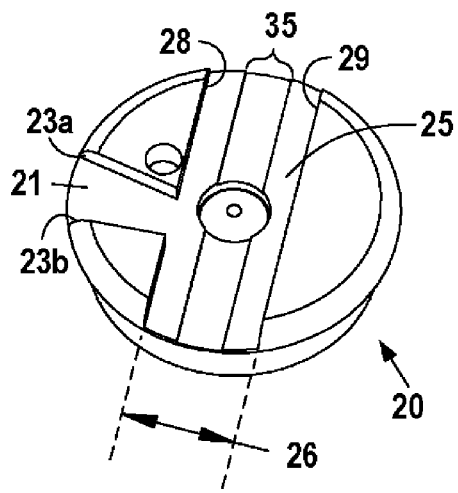
Figure 3:
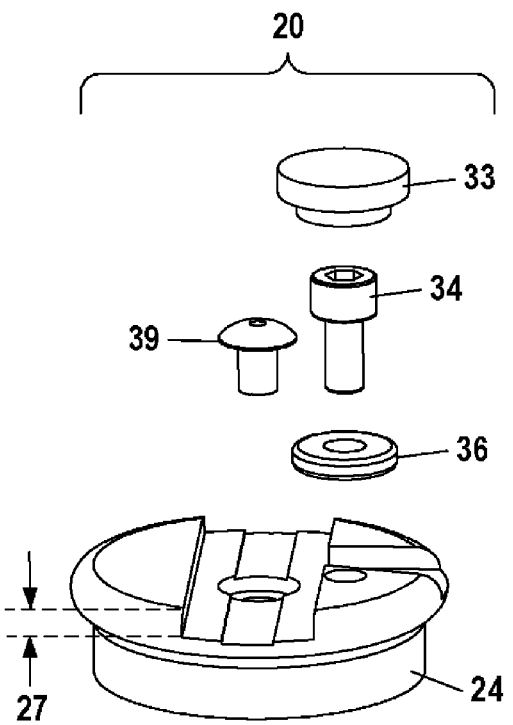
FIG. 3 is an exploded view diagram of the components used to assemble the magnetic caliper mounting device of FIGS. 2A-2C.

The invention contemplates a wide variety of retainers adapted to releasably secure the scale bar 12 of the caliper 10 within the scale bar mounting channel 25 of the caliper mount 24. In FIGS. 2A-2C and 3, the retainer comprises a thumb screw 30 that is mounted vertically with respect to the scale bar mounting channel 25 of the caliper mount 24. The thumb screw 30 comprises a twist cap 33 that presses onto a socket head cap screw 34. A plastic washer 36 is mounted on a shaft 34 of the thumb screw 30 (i.e., on the socket head cap screw 34) and is adapted to press against the top surface of the scale bar 12 of the caliper 10. The threads of the socket head cap screw 34 are received by a nut 37 that is mounted on the inside of the caliper mount 24, above the magnet 22. In FIGS. 2A-2C, the retainer 30 is adapted to also releasably secure the movable outside jaw 16 of a sliding caliper 10 within the tapered jaw mounting channel 21 of the caliper mount 24.

FIGS. 5 and 6 depict an alternative magnetic caliper mounting apparatus 50 with another embodiment of a retainer. The retainer comprises a thumb screw 60 that is mounted horizontally with respect to the scale bar mounting channel 55 of the caliper mount 54. As with FIG. 3, the thumb screw 50 comprises a twist cap 63 that presses onto a socket head cap screw 64. The threads of the socket head cap screw 64 are received by an internally threaded insert or bushing 66. The thumb screw 60, when turned to the engaging position, presses against a flexible wall 52 of the scale bar mounting channel 55, causing the flexible wall 52 to press against a side of the scale bar 12 of the caliper 10. When turned to a disengaging position, the thumb screw 60 backs off the flexible wall 52, thereby releasing the caliper 10 from the mounting channel 55's grip.

Figure 7B:
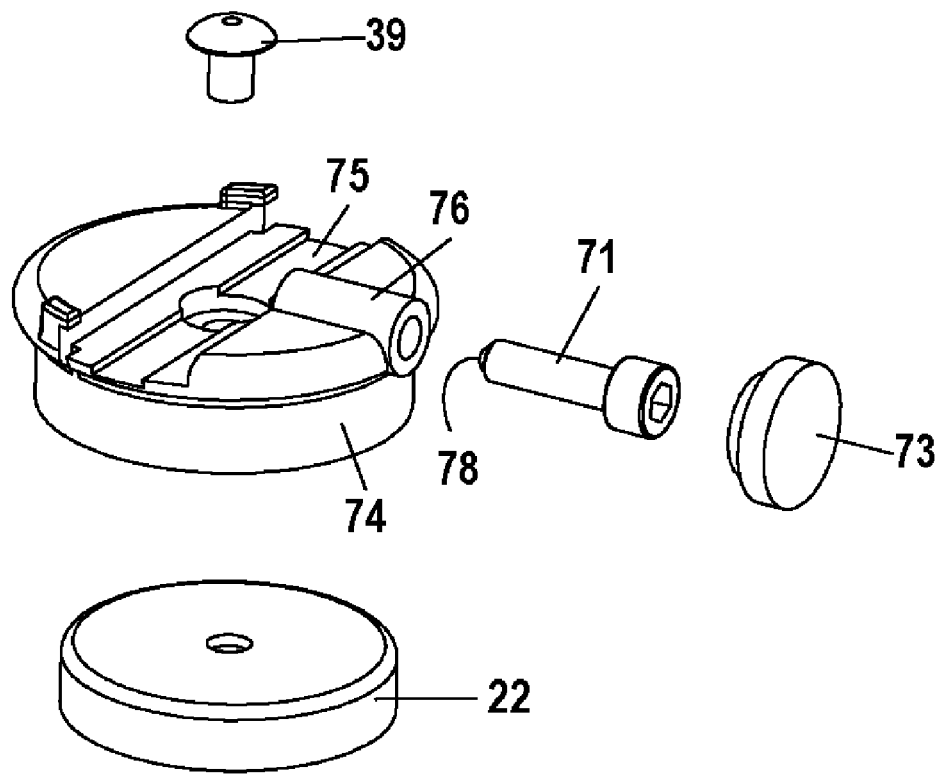
FIG. 7B is an exploded view diagram of the components used to assemble the magnetic caliper mounting device of FIG. 7A.
Figure 7A:
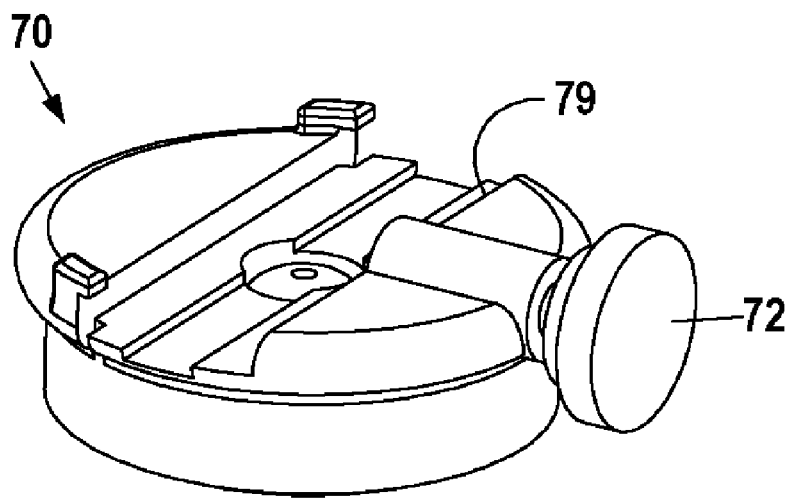
FIG. 7A is a perspective view of another embodiment of a magnetic caliper mounting device with a plastic-tipped horizontal screw for securing the scale bar of a caliper.

FIGS. 7A and 7B depict another alternative magnetic caliper mounting apparatus 70 with yet another embodiment of a retainer. As with FIGS. 5 and 6, the retainer comprises a thumb screw 72 that is mounted horizontally with respect to the scale bar mounting channel 75 of the caliper mount 74. As with FIGS. 5 and 6, the thumb screw 72 comprises a twist cap 73 that presses onto a socket head cap screw 71, whose threads are received by an internally threaded insert or bushing 76. But in this embodiment, the thumb screw 72 has a plastic or polymer tip 78 that, when turned to the engaging position, protrudes through wall 79 of the scale bar mounting channel 75, and presses against a side of the scale bar 12 of the caliper 10. When turned to a disengaging position, the tip 78 of the thumb screw 72 backs away from the side of the scale bar 12 of the caliper 10, releasing the caliper 10 from the mounting channel 75's grip.

Figures 8A, 8B:
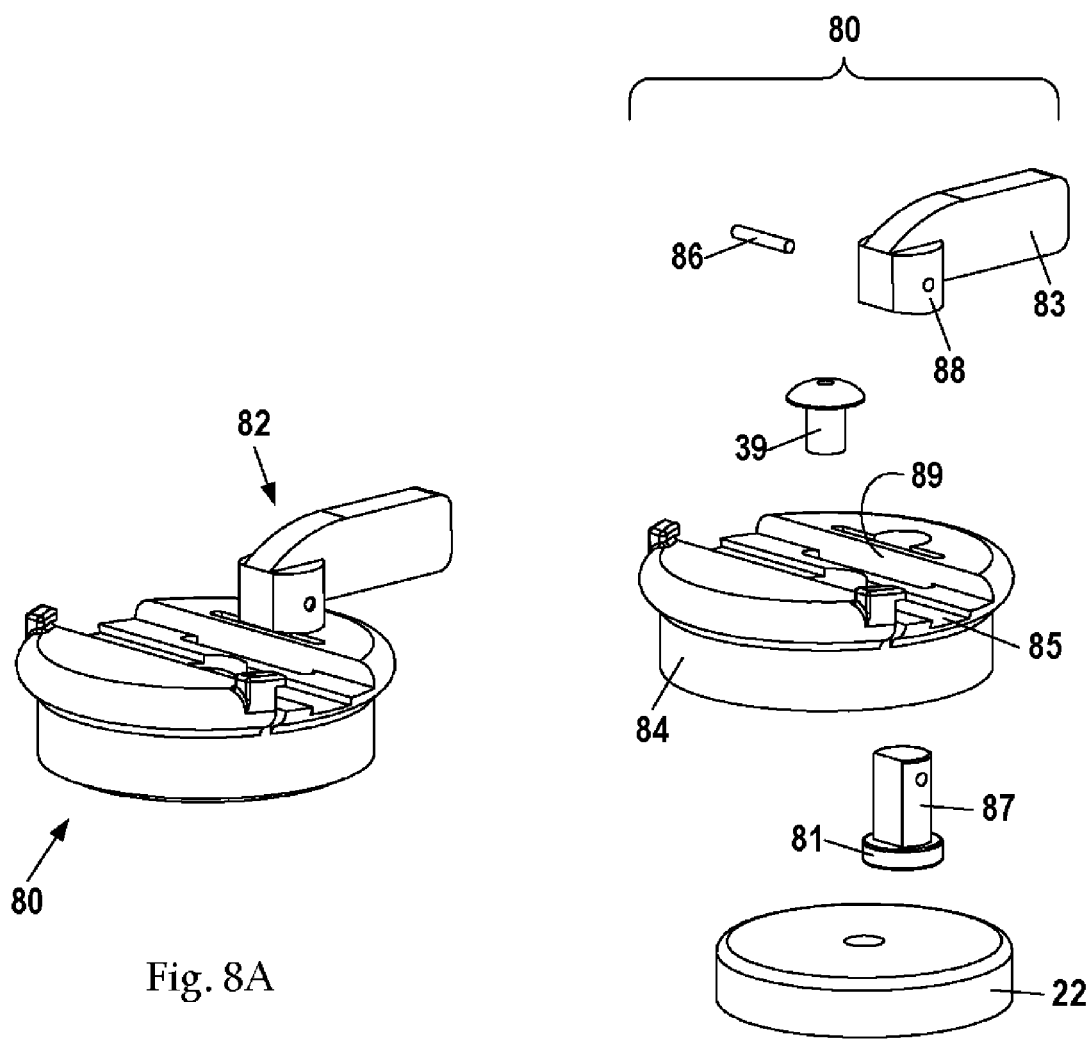
FIG. 8A is a perspective view of another embodiment of a magnetic caliper mounting device with a cam for securing the scale bar of a caliper.
FIG. 8B is an exploded view diagram of the components used to assemble the magnetic caliper mounting device of FIG. 8A.

FIGS. 8A and 8B provide perspective and exploded views of another alternative magnetic caliper mounting device 80 with yet another embodiment of a retainer. The retainer comprises a cam 82 that is mounted to a side of the channel 85 of the caliper mount 84 and is operable to rotate about a vertical axis between a caliper release position and a caliper retaining position. Cam 82 comprises a handle 83 that is secured by a pin 86 to the end of a vertically-mounted cam shaft 81. When the cam handle 83 is turned from a release position to a retaining position, the projecting cam portion 87 of the cam shaft 81 presses against a flexible wall 89 of the channel 85, causing the flexible wall 89 to press against a side of the scale bar 12 of the caliper 10. The handle 83 also has a projecting cam portion 88 that, when turned to the engaging position, overlies and additionally clamps the caliper scale bar 12 in place.

Figures 9A, 9B:
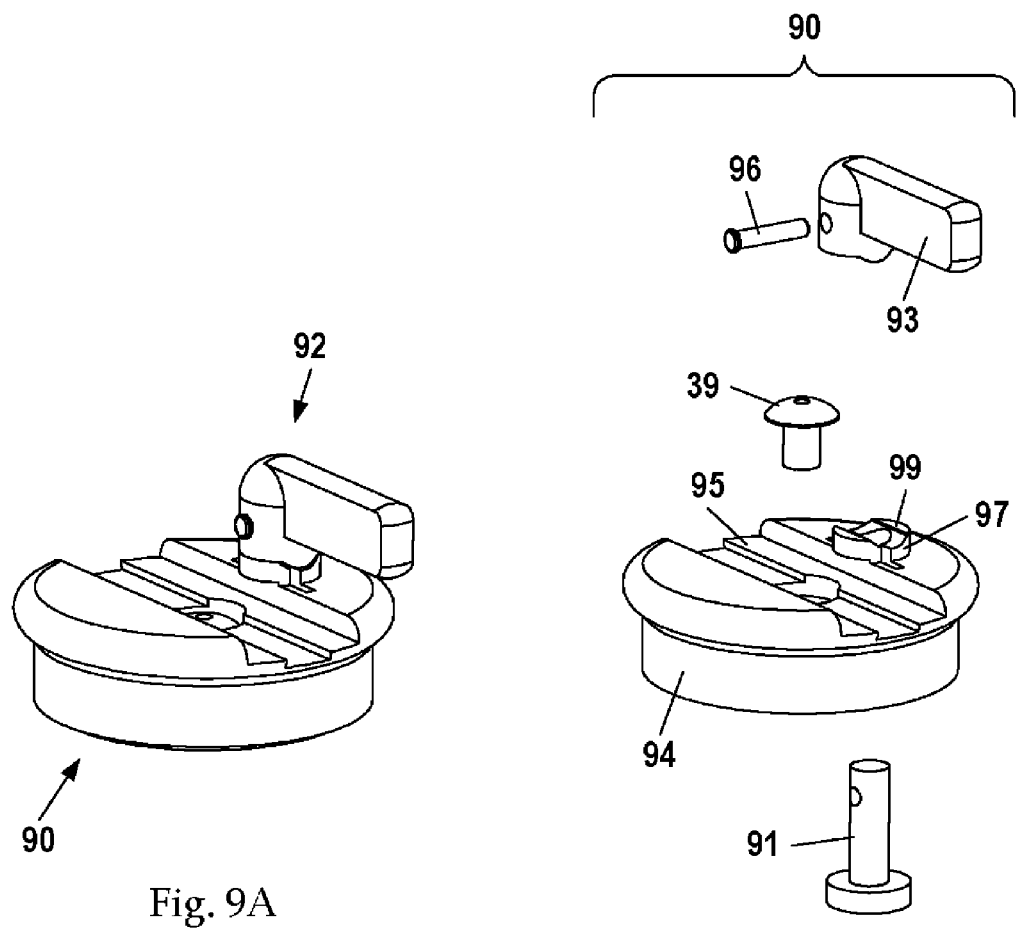
FIG. 9A is a perspective view of another embodiment of a magnetic caliper mounting device with a different type of cam for securing the scale bar of a caliper.
FIG. 9B is an exploded view diagram of the components used to assemble the magnetic caliper mounting device of FIG. 9A.

FIGS. 9A and 9B provide perspective and exploded views of another embodiment of a magnetic caliper mounting device 90 with a different type of cam 92 for securing the scale bar 12 of a caliper 10. Like cam 82, cam 92 is mounted to a side of the channel 95 of the caliper mount 94 and is operable to rotate about a vertical axis between a caliper release position and a caliper retaining position. Cam 92 comprises a cam handle 93 that is mounted on a cooperating cam piece 99 and secured by a pin 96 to a shaft 91 that anchors the cam 92 to the housing of the caliper mount 94. When the cam handle 93 is turned from an open position to a closed position, the projecting cam portion 97 of the cam piece 99 overlies and clamps the caliper scale bar 12 in place.

Figure 10A:
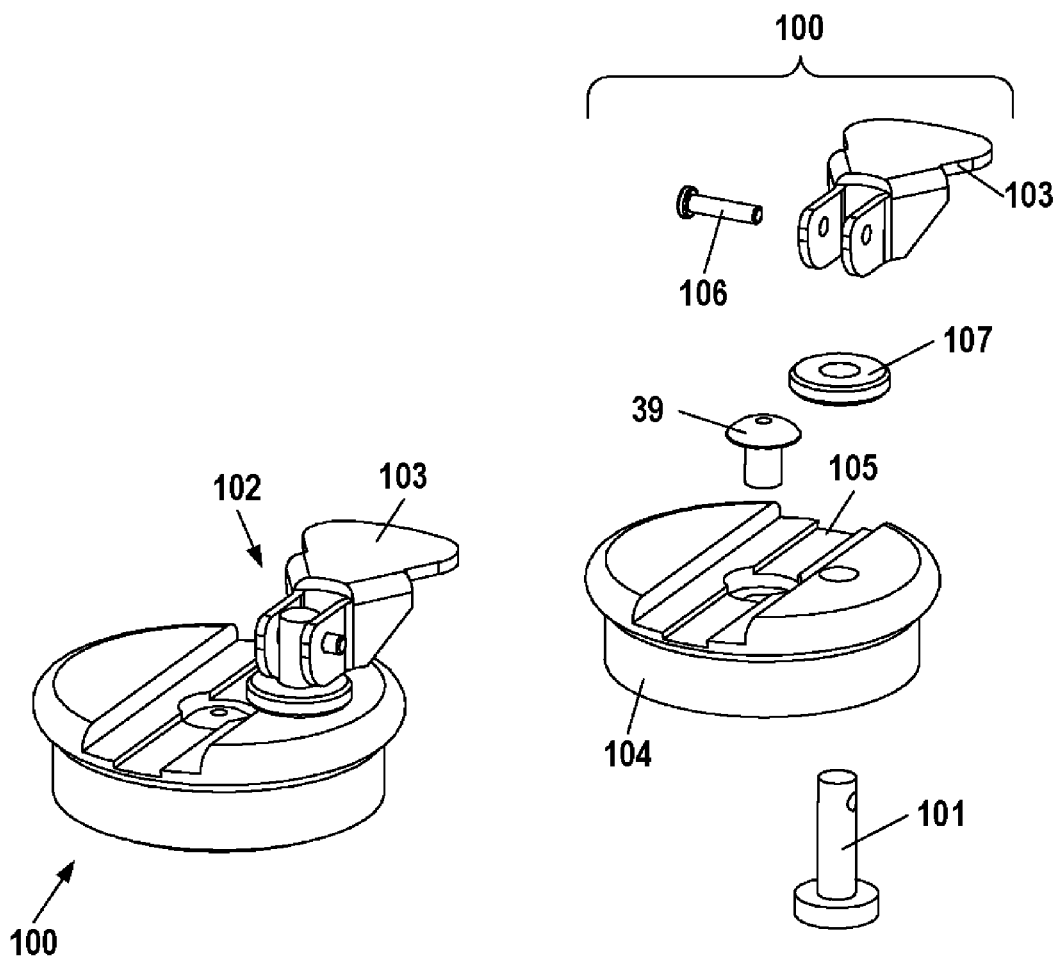
FIG. 10A is a perspective view of another embodiment of a magnetic caliper mounting device with yet another different type of cam for securing the scale bar of a caliper.
Figure 10B:
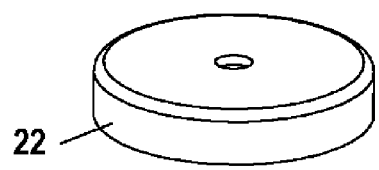
FIG. 10B is an exploded view diagram of the components used to assemble the magnetic caliper mounting device of FIG. 10A.

FIGS. 10A and 10B provide perspective and exploded views of another embodiment of a magnetic caliper mounting device 100 with a different type of cam 102 for securing the scale bar 12 of a caliper 10. Like cams 82 and 92, cam 102 is mounted to a side of the channel 105 of the caliper mount 104 and is operable to rotate about a vertical axis between a caliper release position and a caliper retaining position. Cam 102 comprises a cam handle 103 that is secured by a horizontal pin 106 to a shaft 101 that anchors the cam 102 to the housing of the caliper mount 104. A washer 107 mounted on the shaft 101 beneath the handle 103 facilitates movement of the cam 102. The cam 102 works by pushing down on the cam handle 103 (which rotates about horizontal pin 106) to lock the caliper 10 in place or pulling up on the cam handle 103 to release the caliper 10.

Figure 11A:
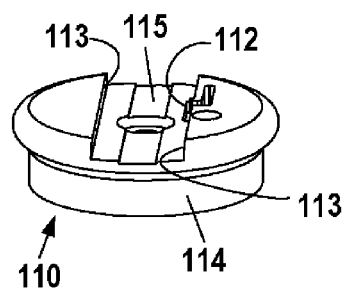
FIG. 11A is a perspective view of another embodiment of a magnetic caliper mounting device using a spring finger to bias the scale bar of a caliper to one side of the slot.
Figure 11B:
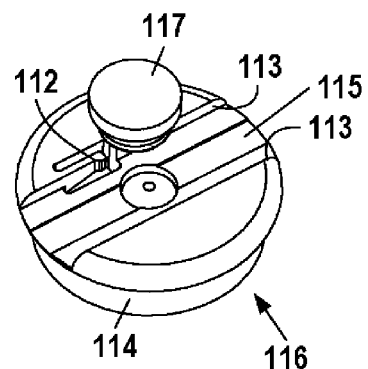
FIG. 11B is a perspective view of another embodiment of a magnetic caliper mounting device using both a thumb screw and a spring finger to secure the scale bar of a caliper.

FIG. 11A illustrates a magnetic caliper mounting device 110 using a spring finger 112 to secure the scale bar of a caliper. A spring finger 112 is embedded in one of the walls 113 of the scale bar mounting channel 115 of the caliper mount 114. Other embodiments may include an opposing pair or two opposing pairs of spring fingers 112 mounted in both walls 113 of the scale bar mounting channel 115. FIG. 11B is a perspective view of another embodiment of a magnetic caliper mounting device 116 using both a thumb screw 117 and a spring finger 112 to bias the scale bar of a caliper to the opposite wall (and optionally under a lip, not shown, of the opposite wall) of the channel 115.

Figure 12:
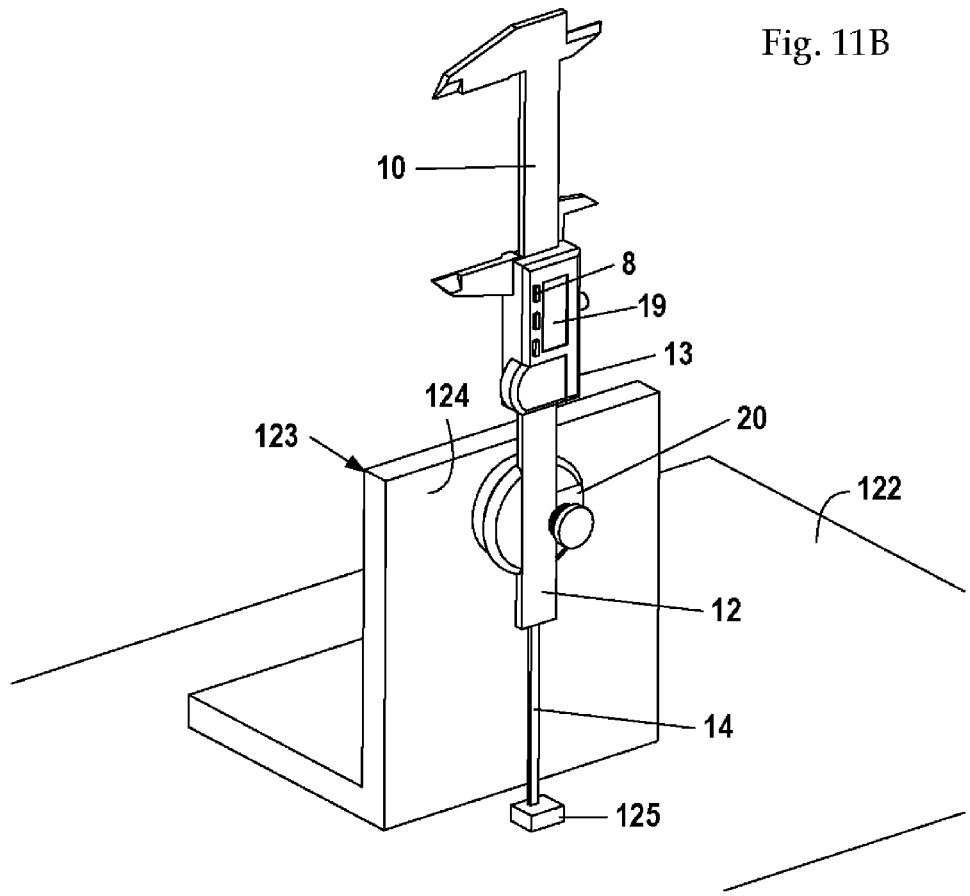
FIG. 12 is a perspective view of a magnetic caliper mounting device mounted vertically as a height gage for precise true size comparisons.

FIG. 12 illustrates the use of the magnetic caliper mounting device 20 as a height gage for precise true size comparisons of a widget 125. The magnetic caliper mounting device 20 is attached to the vertical face 124 of a metal piece 123 sitting on top of a flat table 122. A digital readout caliper 10 is mounted in the magnetic caliper mounting device 20 so that the scale bar 12 is vertically positioned. The movable frame 13 is moved to its lowest position, with the depth probe 14 contacting the surface of the table 122. The "zero set" button 8 of the digital readout 19 is set. Next, the movable frame 13 is lifted, a widget 125 inserted beneath the depth probe 14, and the movable frame 13 again lowered, this time so that the depth probe 14 contacts the top of the widget 125. Then, the widget's width is read from the digital readout.

Figure 13:
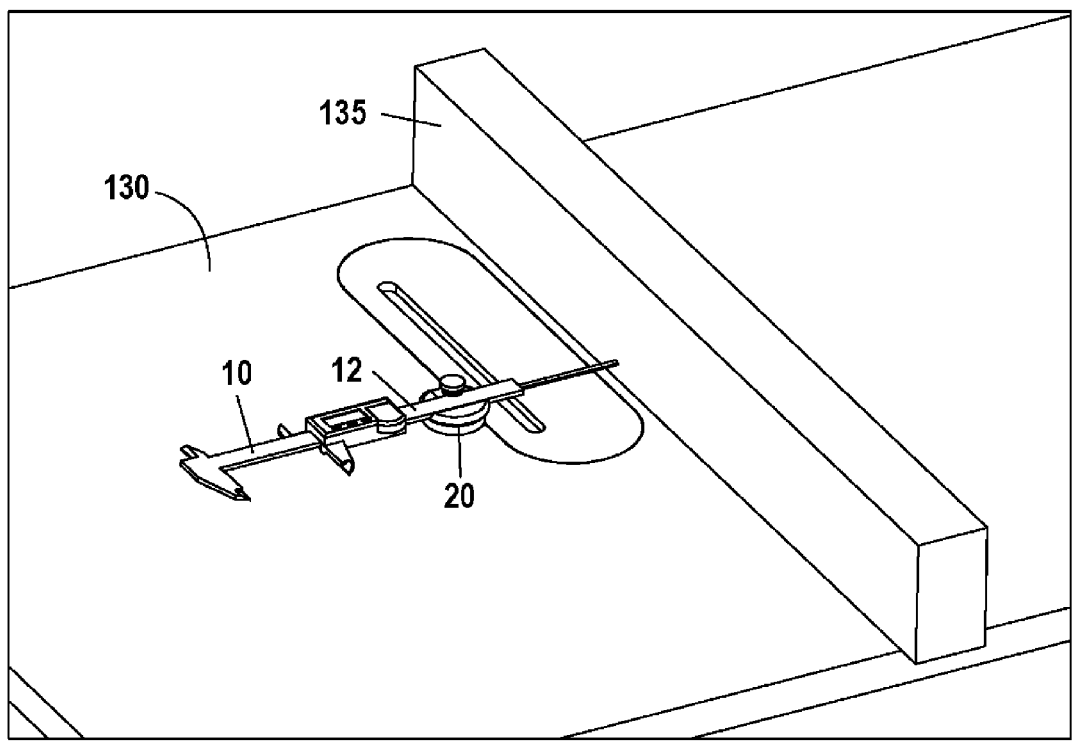
FIG. 13 is a perspective view of a magnetic caliper mounting device mounted on a table saw for precise positioning of the table saw fence.

FIG. 13 illustrates the use of the magnetic caliper mounting device 20 mounted on a table saw 130 for precise positioning of the table saw fence 135. The magnetic caliper mounting device 20 is attached to the upper surface of the table saw 130. A digital readout caliper 10 is mounted in the magnetic caliper mounting device 20 so that the scale bar 12 is positioned horizontally and perpendicular to the saw fence 135. When a very precise cut is needed for a groove or board width, the following procedure may be utilized. First, adjust the fence 135 in close proximity to the desired location of the cut. Second, make a sample cut. Third, use a caliper 10 to measure any needed adjustment to the cut. Fourth, mount the caliper 10 in magnetic caliper mounting device 20, position the caliper's movable frame 13 so that the depth probe 14 touches the fence 135, and press the "zero set" button 8. Fifth, move the fence 135, while watching the caliper's digital readout 19, until it reflects the needed adjustment measured in step 3.

Figures 14A, 14B:
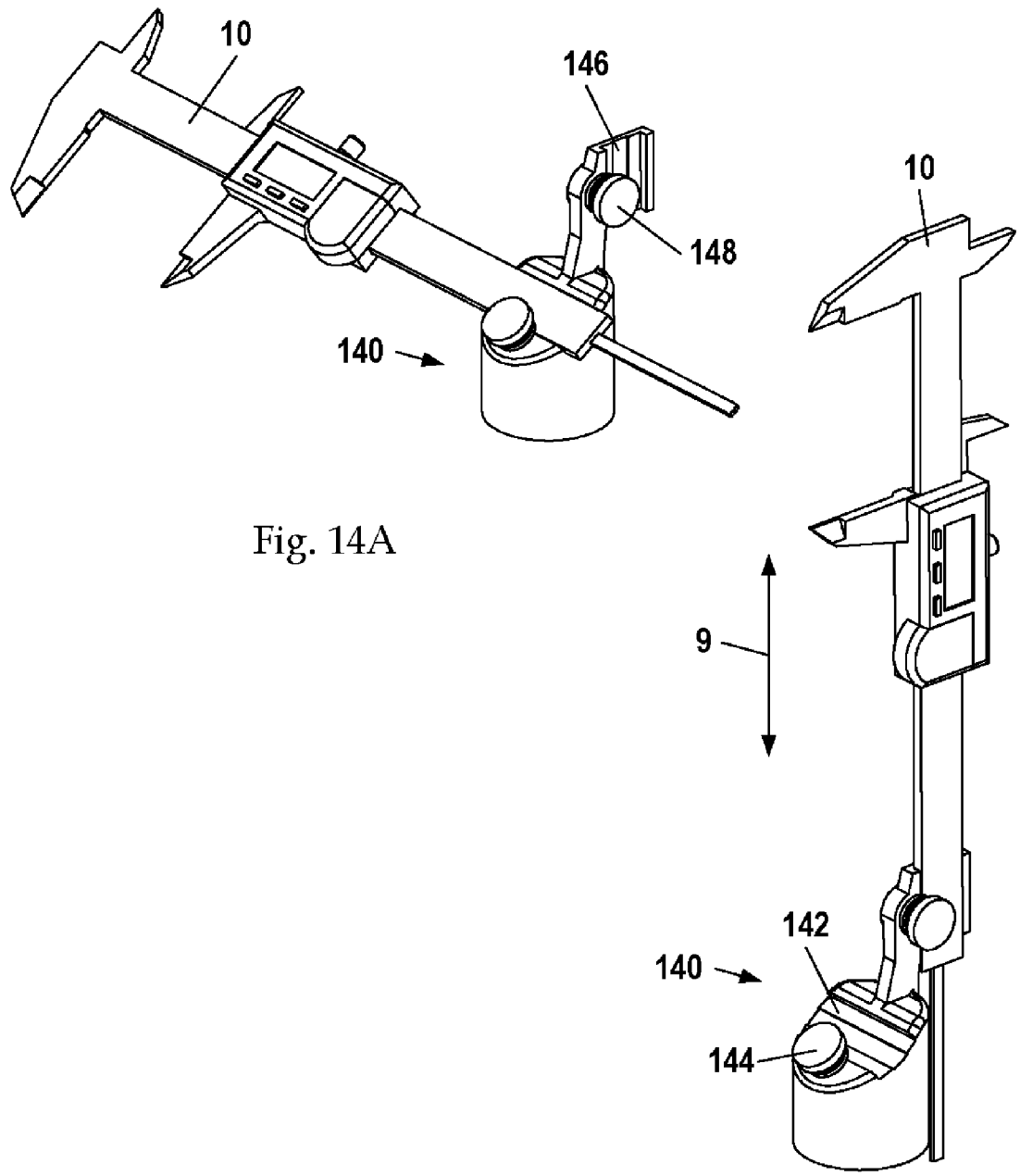
FIGS. 14A-14B are perspective views of another embodiment of a magnetic caliper mounting device having two orthogonally-oriented scale-bar mounting channels operable to mount two calipers simultaneously.

FIGS. 14A and 14B illustrate an embodiment of a magnetic caliper mounting device 140 having two orthogonally-oriented scale-bar mounting channels 142 and 146 operable to mount a caliper 10 in two different orientations or two calipers 10 simultaneously. A first scale-bar mounting channel 142 is oriented to hold the caliper parallel to a planar metal surface to which the caliper mounting device 140 is mounted. The channel 142 is preferably also oriented at an angle of between 15 and 45 degrees, more preferably about 30 degrees, to tilt a mounted caliper 10 in a direction that makes measurement reading easier. A second scale-bar mounting channel 146 is oriented to hold the longitudinal axis 9 of another caliper 10 perpendicular to the planar metal surface to which the caliper mounting device 140 is mounted. A retainer 144 or 148 positioned to the side of each channel 142 and 146 is operable to secure a caliper within its corresponding channel 142 or 146. Because channels 142 and 146 are oriented at right-angles to one another, the device 140 is operable to simultaneously mount two calipers 10 in orientations perpendicular to one another.

FIGS. 15A-15B are perspective views of another embodiment of a magnetic caliper mounting device 150 with a switchable permanent magnet (not shown) and a pivotable caliper holder 152 operable for mounting a caliper 10 at any of a plurality of angular orientations around an axis parallel to the caliper mounting device's mounting surface. The caliper mounting device 150 comprises a molded plastic main housing 156 that houses a switchable permanent, non-electric magnet, a knob 157 for activating and de-activating the magnet, and a pivotable caliper holder 152. Pivotable caliper holder 152, which may be made of molded plastic, has a caliper scale-bar mounting channel 153 and a retainer 154 for securing a caliper 10 within the channel 153. Caliper holder 152 is joined to the main housing 156 by a joint or hinge 155, which in a simple form takes the form of a screw that can be tightened against a nut 158. The switchable permanent magnet is preferably, but not necessarily, of a form described by U.S. Pat. No. 6,707,360, which is incorporated herein by reference.

FIG. 16A illustrates a caliper 10 mounted on the caliper mounting device 150 of FIGS. 15A-15B. FIG. 16B illustrates a caliper 10 and spring pack 260 (FIG. 26) mounted between the retainer 154 of the caliper mounting device 150 and the clamping screw 251 of the movable frame 13 of the caliper 10 (FIG. 25). As explained further below, the spring pack 260 biases the movable frame 13 together with movable outside jaw 16, movable inside jaw 18, and depth probe 14 toward an extended position.

Figure 17:
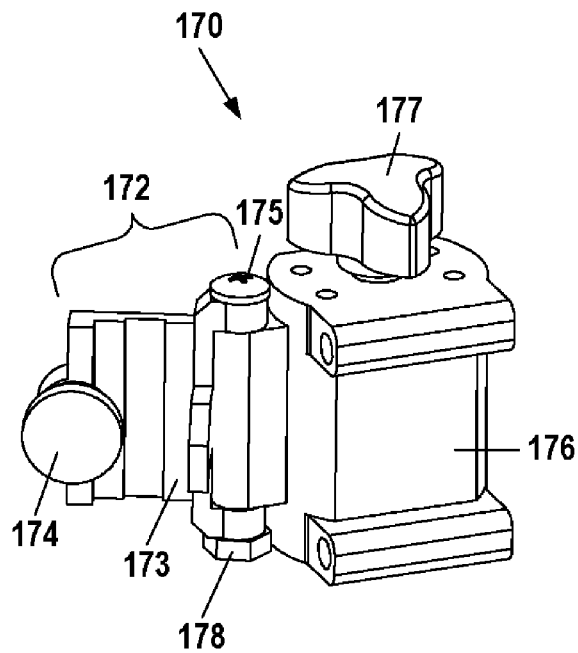
FIG. 17 is a perspective view of another embodiment of a magnetic caliper mounting device with a switchable magnet and a pivotable caliper holder operable for mounting a caliper at any of a plurality of angular orientations around an axis perpendicular to the caliper mounting device's mounting surface.
Figure 19:
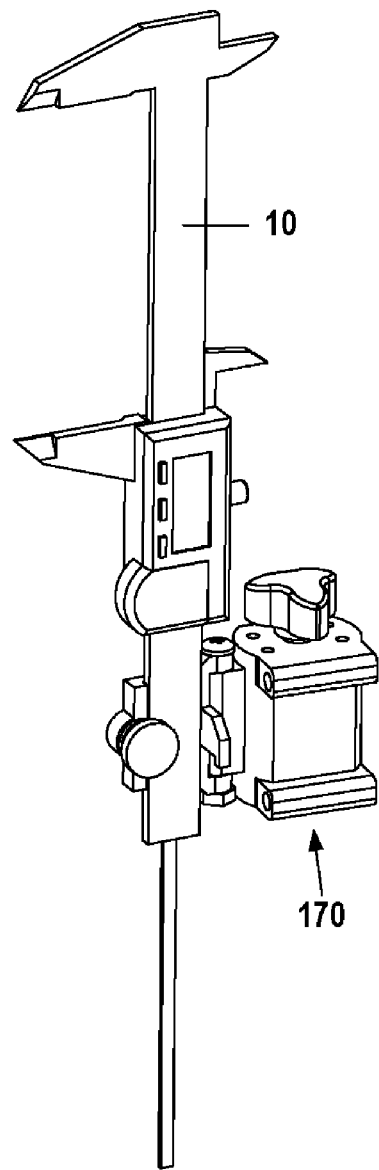
FIG. 19 is a perspective view of caliper mounted in the magnetic caliper mounting device of FIG. 17.

FIG. 17 illustrates another embodiment of a magnetic caliper mounting device 170 with a switchable magnet and a pivotable caliper holder 172 operable for mounting a caliper 10 at any of a plurality of angular orientations around an axis perpendicular to the caliper mounting device's mounting surface. The caliper mounting device 170 comprises a molded plastic main housing 176 that houses a switchable, non-electric magnet, a knob 177 for activating and de-activating the magnet, and a pivotable caliper holder 172. Pivotable caliper holder 172, which may be made of molded plastic, has a caliper scale-bar mounting channel 173 and a retainer 174 for securing a caliper 10 within the channel 173. Caliper holder 172 is joined to the main housing 176 by a joint or hinge 175, which in a simple form takes the form of a screw that can be tightened against a nut 178. FIG. 19 illustrates a caliper 10 mounted on the caliper mounting device 170 of FIG. 17.

Figure 18:
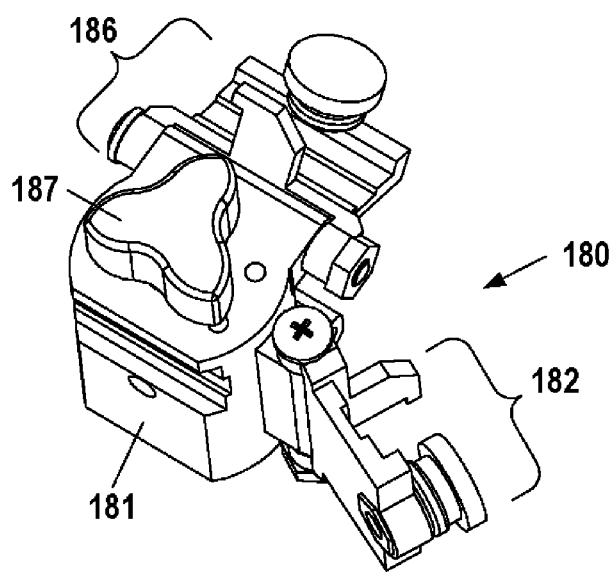
FIG. 18 is a perspective view of another embodiment of a magnetic caliper mounting device with two pivotable caliper holders operable for mounting calipers at any of a plurality of angular orientations around first and second axes that are respectively parallel and perpendicular to the caliper mounting device's mounting surface.

FIG. 18 illustrates yet another embodiment of a magnetic caliper mounting device 180 with two pivotable caliper holders 182 and 186 operable for mounting calipers at any of a plurality of angular orientations around first and second axes that are respectively parallel and perpendicular to the caliper mounting device's mounting surface. The caliper mounting device 180 comprises a molded plastic main housing 181 that houses a switchable, non-electric magnet, a knob 187 for activating and de-activating the magnet, a first pivotable caliper holder 182, and a second pivotable caliper holder 186. The first pivotable caliper holder 182 is joined to the main housing 181 in the same manner as FIG. 15A's pivotable caliper holder 152 is joined to the main housing 156. The second pivotable caliper holder 186 is joined to the main housing 181 in the same manner as FIG. 17's pivotable caliper holder 172 is joined to the main housing 176.

Figure 20A:
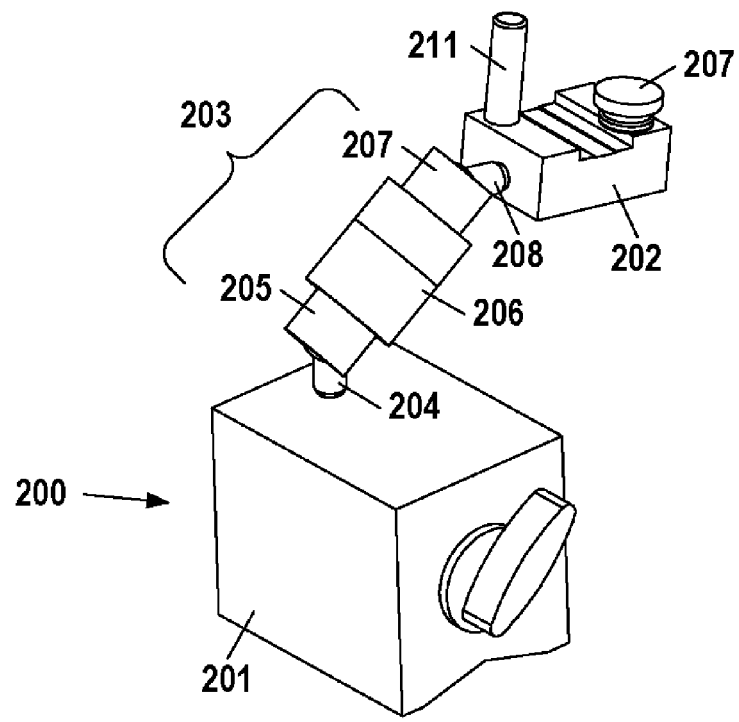
FIG. 20A is a perspective view of another embodiment of a magnetic caliper mounting device with a switchable magnet and a universally jointed caliper holder operable to mount a caliper at any of a plurality of angular orientations in three dimensions.
Figure 20B:
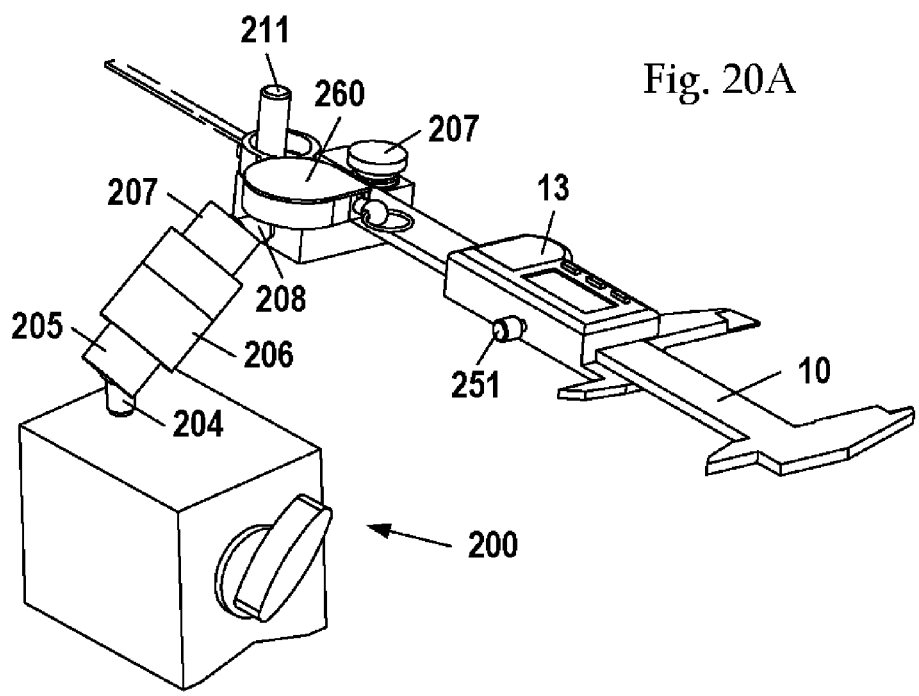
FIG. 20B is a perspective view of a caliper mounted in the magnetic caliper mounting device of FIG. 20A.
Figure 22:
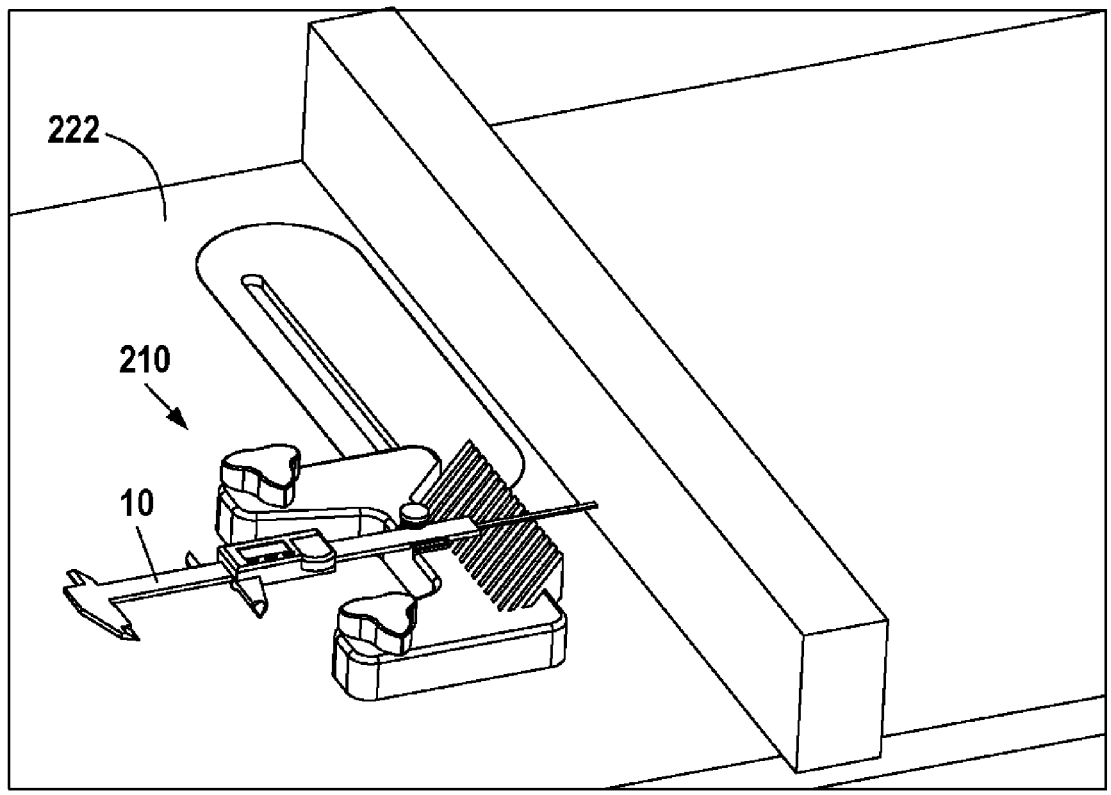
FIG. 22 is a perspective view of the featherboard of FIG. 21 mounted on a table saw.

FIG. 20A illustrates yet another embodiment of a magnetic caliper mounting device 200 with a switchable magnet and a universally jointed caliper holder 202 operable to mount a caliper 10 at any angle with respect to a planar metal surface to which the caliper mounting device 200 is mounted. The caliper holder 202 is coupled to a switchable magnetic base 201 through a universal joint 203. Universal joint 203 comprises three links 204, 206, and 208 each separated by ball joints 205 and 207 placed in series between the caliper holder 202 and switchable magnetic base 201. FIG. 20B illustrates a caliper 10 mounted in the magnetic caliper mounting device 200 of FIG. 20A. Also, a spring pack 260 (FIG. 26) can be mounted on either the thumb screw 209 or a projecting dowel 211 of the caliper holder 202, depending on the direction in which the caliper 10 is mounted relative the caliper holder 202.

Figure 21:
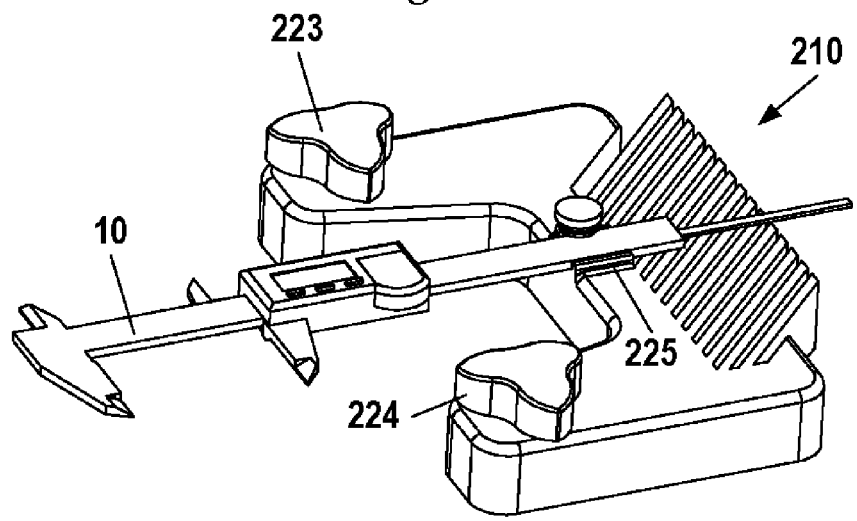
FIG. 21 is a perspective view of another embodiment of a magnetic caliper mounting device taking the form of a featherboard operable to be mounted to a metal surface through two switchable magnets.

FIG. 21 illustrates yet another magnetic caliper mounting device taking the form of a featherboard 210 operable to be mounted to a metal surface such as a table saw top 222 (FIG. 22) through two switchable magnets 223 and 224. The featherboard 210 comprises a caliper holder 225 joined to a standard featherboard, such as that marketed by Magswitch Technology, Inc., based in Littleton, Colo., that includes two switchable magnets 223 and 224.

FIGS. 23, 24A and 24B provide perspective and exploded views of another embodiment of a magnetic caliper mounting device 230 with an integrated caliper jaw extender 235 for biasing the movable frame 13 of a mounted caliper 10 into an extended position. Caliper jaw extender 235 comprises a retractor 243 such as a string or a cord that is spring-biased to spool around a bobbin or spool 241. A connector 244, such as a ring or a hook, on the end of the retractor 243 is provided to connect the retractor to a protuberance such as the clamping screw 251—of the movable frame 13 A spirally-round reel spring 240 is mounted on its outside end 247 to the inside cavity wall 242 of the spool 241. The inside end 246 of the spring 240 is attached to the center post 249 of the main housing 248. The center post 249 also receives the rivet 39 which is used to secure the disc magnet 22 to the main housing 248 of the device 230. The spring 240 has sufficient tension to pull an unobstructed movable frame 13 that is connected to the caliper jaw extender 235 toward an extended position.

One final minor part depicted in FIG. 24A is the L-bracket nut 245. L-bracket nut 245 serves the same function as nut 37 of FIG. 3; that is, to receive the threads of socket head cap screw 34. Here, the "L" of the L-bracket nut is provided to extend around the spool 241.

In FIGS. 23 and 24A, the main housing 248 not only houses both the caliper jaw extender 235 and the disc magnet 22, but also provides the channeled surface that serves as the caliper mount. In another embodiment, the reel spring 240 of mounting device 230 is substituted with a constant force spring 290 as shown and described in connection with FIGS. 28 and 29. The caliper mounting devices 70, 80, 90, 100, 110, 140, 150, 170, 180, 200, and 210 described above may also incorporate similar spring mechanisms.

FIG. 25 illustrates a caliper 10 mounted in the magnetic caliper mounting device 230 of FIG. 23. The refractor connector 244 is hooked on to the clamping screw 251 of the caliper 10, thereby biasing the movable frame 13 together with the movable outside jaw 16, movable inside jaw 13, and depth probe 14 into an extended position. The retractor 243 preferably has a length sufficient to extend the connector 244 at least 4 inches, and more preferably, about 5 to 5¾ inches, away from the main housing 248. In this manner, the movable frame 13 of a conventional caliper 10 can be biased toward an extended position along its entire range of travel (or, if not, a substantial part of that range of travel) upon the scale bar 12.

FIGS. 26 and 27 illustrate a caliper jaw extender in the form of a spring pack accessory 260 that is physically independent of the caliper mounting device. Spring pack accessory 260 connects a wide variety of embodiments of the caliper mounting devices (e.g., devices 20, 50, 70, 80, 90, 100, 140, 150, 170, 180, 200, 210) with the movable frame 13 of the caliper 10 to bias the movable frame into an extended position. Spring pack accessory 260 comprises a housing base 278 and housing cap 279 that enclose a spool 271 around which a retractor 273 is wound. The retractor 273, which in FIGS. 26 and 27 takes the form of a cord, is biased into a spooled position by a reel spring 270 that is embedded in the cavity 272 of the spool 271. A connector 274, such as a ring or a hook, is provided to connect the end of the retractor 273 to the movable frame 13 of the caliper 10. The reel (or spiral torsion) spring 270 has sufficient tension to pull an unobstructed movable frame 13 that is connected to the spring pack accessory 260 toward an extended position. The retractor 273 preferably has a length sufficient to extend the connector 274 at least 4 inches, and more preferably, about 5 to 5¾ inches, away from the housing base 278.

A base connector 275 is provided to mount the spring pack accessory 260 to the magnetic caliper mounting device 20. Preferably, the base connector 275 comprises a molded plastic ring or hook adjoining or formed together with the housing base 278, and having an interior diameter slightly larger than the diameter of the twist cap 33 of the magnetic caliper mounting device 20.

FIGS. 28 and 29 illustrate an alternative embodiment of a spring pack accessory 280 that uses a spirally wound constant force spring 290 instead of a reel spring 270. Spring pack accessory 280 comprises a housing base 298 and housing cap 299 that enclose a constant force spring 290 mounted on a drum 291. An interior loop end 297 of the spring 290 is mounted to anchor 296 of drum 291 before being placed around shaft 292 of housing base 298. Here, the "retractor" comprises a portion of the constant force spring 290. A connector 294, such as a ring or a hook, is provided to connect the end of the constant force spring 290 to the movable frame 13 of the caliper 10. The constant force spring 290 has sufficient tension to pull an unobstructed movable frame 13 that is connected to the spring pack accessory 280 toward an extended position. The constant force spring 290 also preferably has a travel length sufficient to extend the connector 294 at least 4 inches, and more preferably, about 5 to 5¾ inches, away from the housing base 298. A base connector 295 like base connector 275 is provided to mount the spring pack accessory 280 to the magnetic caliper mounting device 20.

Figure 30A:
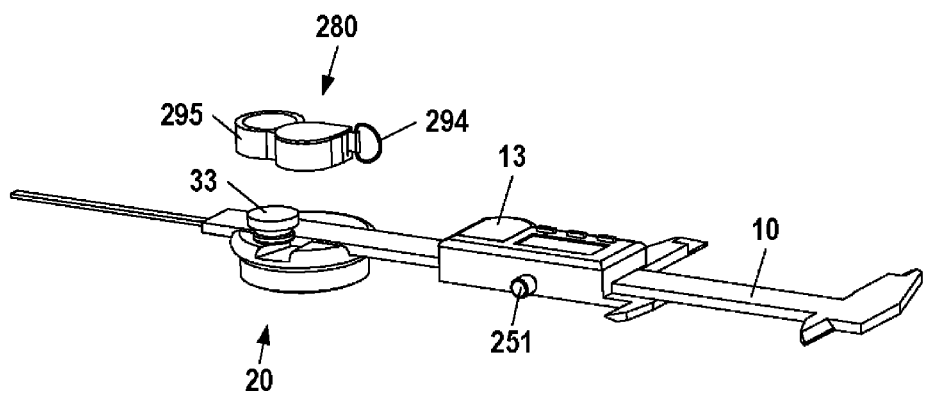
FIG. 30A is a perspective view of the spring pack accessory of FIG. 28 positioned above a magnetic caliper mounting device and caliper.
Figure 30B:
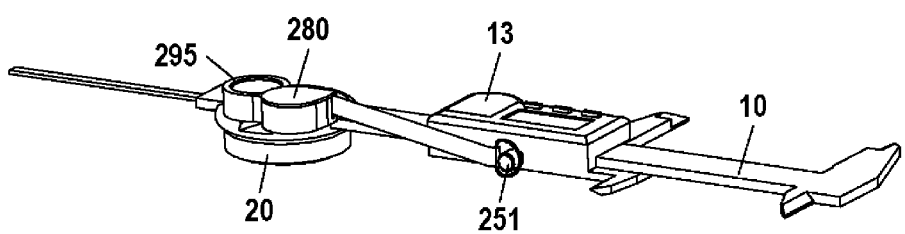
FIG. 30B is a perspective view of the spring pack accessory of FIG. 28 mounted on the magnetic caliper mounting device and whose constant force spring is hooked on the movable part of the caliper.

FIG. 30A illustrates the spring pack accessory 280 of FIG. 28 positioned above a magnetic caliper mounting device 20 and caliper 10. FIG. 30B illustrates the spring pack accessory 280 mounted on the magnetic caliper mounting device 20 by hooking base connector 295 onto twist cap 33. The constant force spring 290 of spring pack accessory 280 is connected to the movable frame 13 of the caliper 10 by having connector 294 hooked onto clamping screw 251.

The caliper mounting device 230 or spring accessory pack 260 or 280 can be used to precisely measure the linear distance between first and second positions of an adjustable portion of a machining tool. A method could be described as follows: (1) obtaining a digital caliper 10 having a scale bar 12, a movable jaw 16, a telescoping depth rod 14 that moves cooperatively with the movable jaw; and a digital readout 19 having a zero-set button 8; (2) mounting the scale bar 12 of the digital caliper 10 to a caliper mount 20; (3) mounting the caliper mount 20 to a motionless portion of the machining tool in an orientation wherein the telescoping depth rod 14 is parallel with a linear path between the first and second positions, and wherein a measurement end of the telescoping depth rod 14, while in a substantially retracted position, butts up against an adjustable portion of the machining tool in its first position; (4) mounting a spring-tensioned retractor 243 or 273 between the movable frame 13 and the caliper mount 20 in order to bias the depth rod 14 toward an extended position; (5) resetting the digital readout 19 of the caliper 10 to the zero position; (6) moving the adjustable portion of the machine from the first position to the second position, during which the spring-tensioned retractor retracts, causing the telescoping depth rod 14 to maintain contact with the adjustable portion of the machine; and (7) reading the digital readout 19 of the caliper 10 to measure the distance traveled between the first and second positions.

FIG. 31 illustrates a rod-mountable non-magnetic caliper mount 310. Caliper mount 310 comprises a scale bar mounting channel 315 and retainer 318 for securing the scale bar 12 of a caliper 10. Caliper mount 310 further comprises a cylindrically-shaped hole 312 for affixing the device 310 to a rod (not shown), and a tightener 319, such as a bolt or screw, for clamping the device 310 to the rod. The hole 312 preferably has a diameter of approximately ¼ or ⅜ of an inch (when tightened), making it suitable for mounting on a standard magnetic base holder such as that marketed by McMaster-Carr based in Robbinsville, N.J.

FIG. 32A illustrates another non-magnetic caliper mount 320 configured for mounting on the horizontal mounting bar of a metal lathe. Caliper mount 320 comprises a scale bar mounting channel 325 and retainer 328 for securing the scale bar 12 of a caliper 10. Caliper mount 320 further comprises a channel 322 sized and shaped to mount on the horizontal mounting bar of a metal lathe. FIG. 32B illustrates a caliper 10 mounted on the caliper mount 320 and a spring pack accessory 260 hooked on both the caliper mount 320 and the movable frame 13 of the caliper 10.

Figure 33:
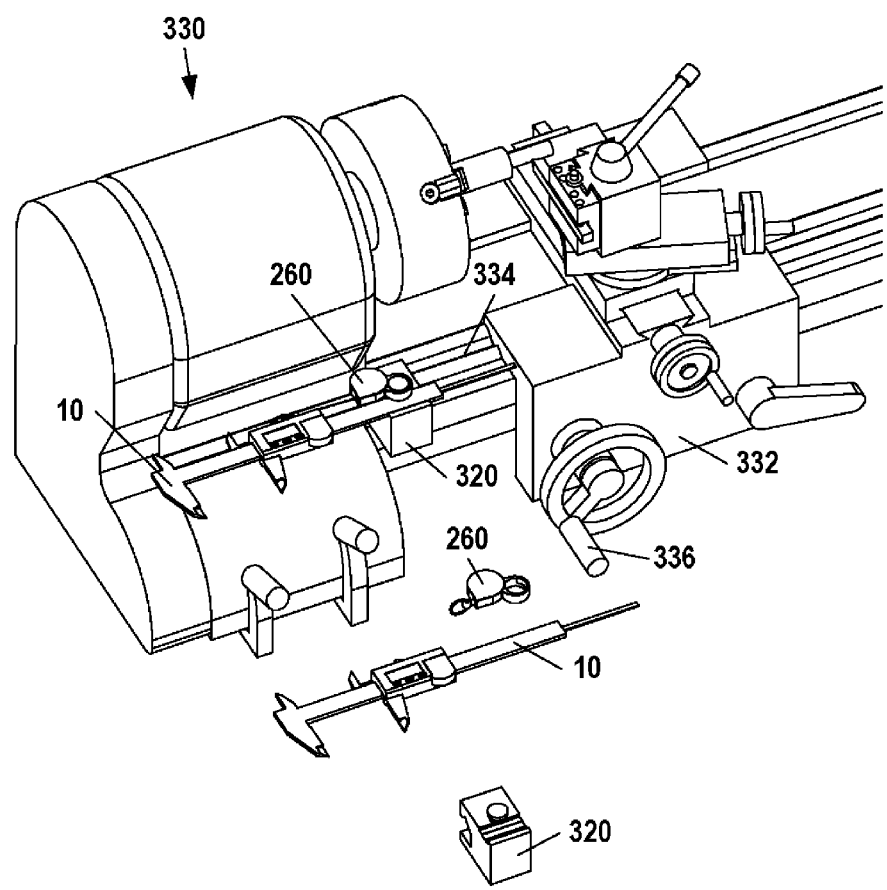
FIG. 33 is a perspective view of the non-magnetic caliper mounting device of FIGS. 32A-32B mounted on the horizontal mounting bar of a metal lathe to provide for precise positioning of the lathe saddle or carriage.

FIG. 33 is a perspective view the non-magnetic caliper mount 320 of FIGS. 32A-32B mounted on the bed 334 of a metal lathe 330 to provide for precise positioning of the lathe saddle or carriage 332. A caliper 10 is mounted in the caliper mount 320, and a spring pack accessory 260 is mounted on the caliper mount 320 and caliper 10 to bias the movable part 13 toward the lathe saddle or carriage 332. As hand crank 336 is turned, causing the saddle or carriage 332 to move to the right or left, the caliper 10 provides precise information of the position of the lathe saddle or carriage 332. It will be understood that a magnetic caliper mounting device 20 can be used in place of the non-magnetic caliper mount 320.

Figures 34A, 34B:
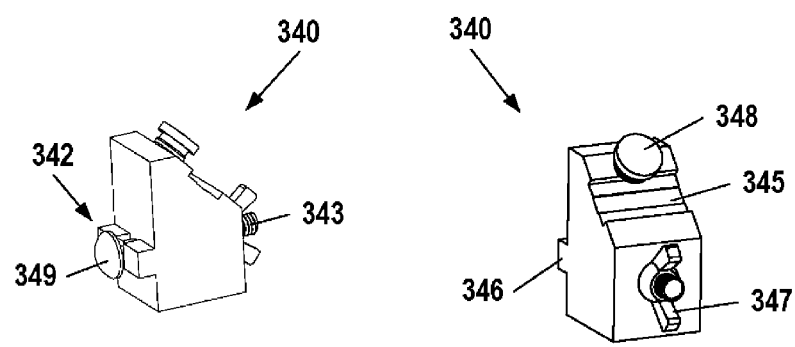
FIGS. 34A-34B are perspective views of an embodiment of a non-magnetic caliper mounting device configured for mounting the device to the X-axis T-slot of a mill.
Figure 34C:
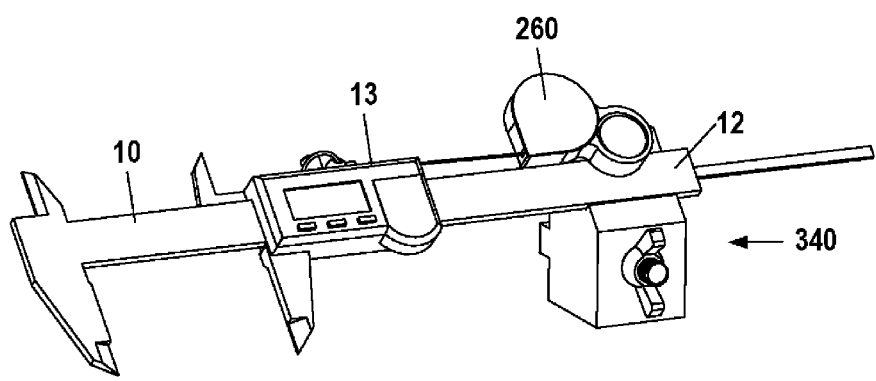
FIG. 34C is a perspective view of a caliper mounted in the caliper mounting device of FIGS. 34A-34B.

FIGS. 34A and 34B illustrate another non-magnetic caliper mount 340 configured for mounting on the X-axis T-slot of a mill. Caliper mount 340 comprises a scale bar mounting channel 345 and retainer 348 for securing the scale bar 12 of a caliper 10. Caliper mount 340 further comprises a T-slot connector 342. T-slot connector 342 comprises a projection 346 sized and shaped to fit in the horizontal portion of the mill's X-axis T-slot, and a bolt 343 whose head 349 fits in the vertical portion of the mill's X-axis T-slot. A wing nut 347 is provided to tighten the bolt head 349 against an inside wall of the T-slot. FIG. 34C illustrates a caliper 10 mounted on the caliper mount 340 and a spring pack accessory 260 hooked on both the caliper mount 340 and the movable frame 13 of the caliper 10.

Figure 35A:
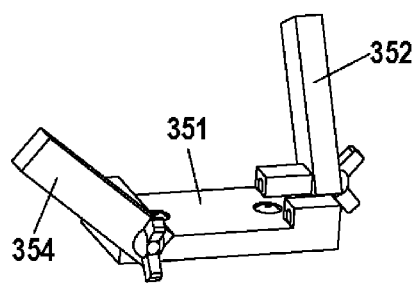
FIGS. 35A-35C are perspective views of a magnetically-mounted, universally positionable caliper depth probe stop accessory.
Figure 35B:
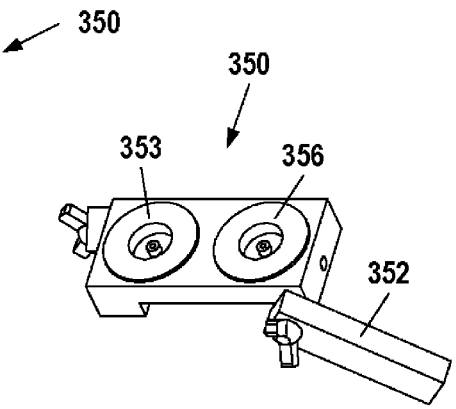
Figure 35C:
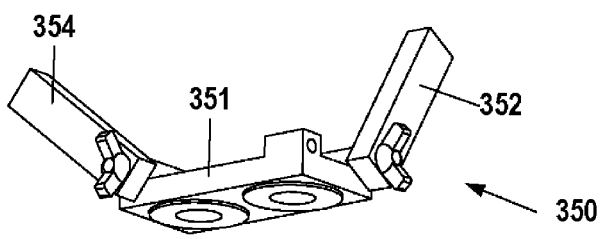

FIGS. 35A-35C are perspective views of a magnetically-mounted, universally positionable caliper depth probe stop accessory 350. Depth probe stop accessory 350 comprises a base member 351 and two rotatable arms 352 and 354. Base member 351 has two magnets 353 and 356 for securing the depth probe stop accessory 350 to a flat metal surface. Each of the rotatable arms 352 and 354 are pivotally attached to the base member 351, and can be rotated about an axis to limit the extent of movement of the depth probe 14 of a caliper 10. The rotatable arms 352 and 354 rotate about two perpendicular axes that run parallel to the flat metal surface to which the accessory 350 is secured.

Figure 36A:
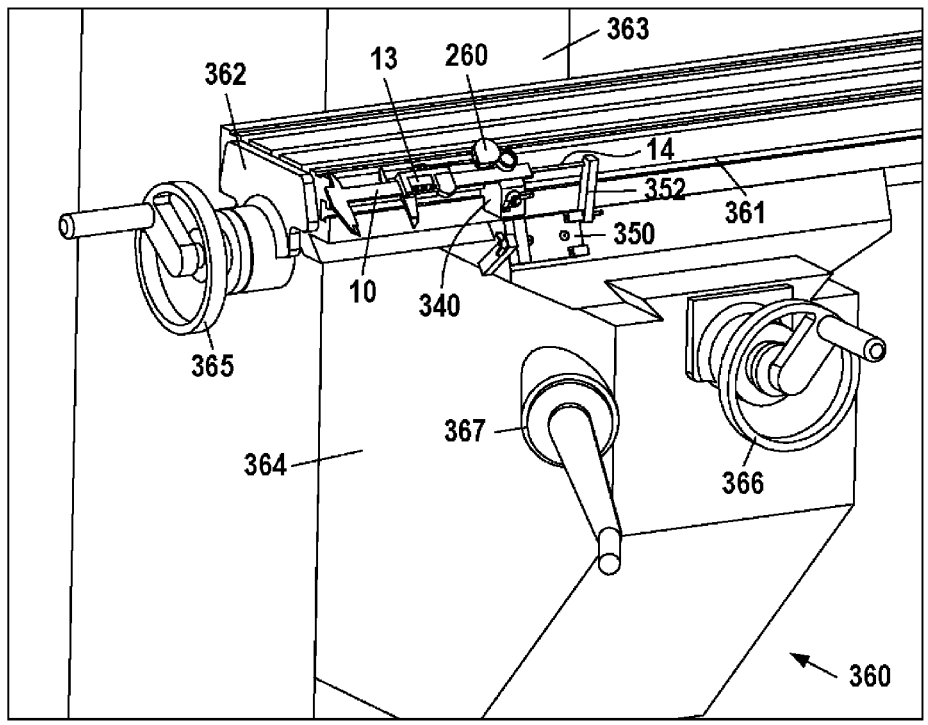
FIG. 36A is a perspective view of the non-magnetic caliper mounting device of FIGS. 34A-34B and the caliper depth probe stop accessory of FIGS. 35A-35C mounted on a milling machine to provide for precise positioning of the travel table.

FIG. 36A is a perspective view of the non-magnetic caliper mounting device 340 of FIGS. 34A-34B and the caliper depth probe stop accessory 350 of FIGS. 35A-35C mounted on a milling machine 360 to provide for precise positioning of the travel table 362. The milling machine 360 comprises a travel table 362 mounted on a milling machine table Z-axis support frame 364 mounted in turn to a base frame 363 of the milling machine. The milling machine 360 also comprises an X-axis hand crank 365 operable to move the travel table 362 to the right or left relative to the milling machine table Z-axis support frame 364, a Y-axis hand crank 366 operable to move the travel table 362 toward the front or back of the milling machine table Z-axis support frame 364, and a Z-axis hand crank 367 operable to move the milling machine table Z-axis support frame 364 up or down relative to the base frame 363.

The travel table 362 includes a T-slot 361. The non-magnetic caliper mounting device 340 is mounted to this T-slot 361 so that it moves with the travel table 362. A caliper 10 is mounted on the non-magnetic caliper mounting device 340. The caliper depth probe stop accessory 350 is magnetically mounted to the milling machine table Z-axis support frame 364, and rotatable arm 352 is positioned to stop the depth probe 14 of the caliper 10. A spring pack accessory 260 is mounted on the caliper mounting device 340 and caliper 10 to bias the movable part 13 toward the arm 352 until the depth probe 14 comes into contact with the arm. As hand crank 365 is turned, causing the travel table 362 to move to the right or left (along the X-axis), the caliper 10 provides precise information—typically far more precise than the information that can be obtained by examining the mill's own measurement markings—of the position of the travel table 362.

Figure 36B:
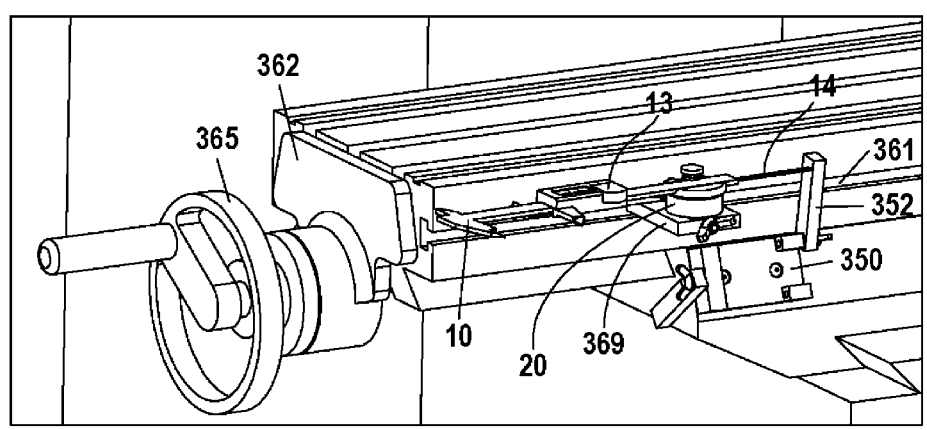
FIG. 36B is a perspective view of the magnetic caliper mounting device 20 of FIG. 2 and the caliper depth probe stop accessory of FIGS. 35A-35C mounted on a milling machine to provide for precise positioning of the travel table.

FIG. 36B is a perspective view of the magnetic caliper mounting device 20 of FIG. 2 and the caliper depth probe stop accessory of FIGS. 35A-35C mounted on a milling machine to provide for precise positioning of the travel table 362. A metallic X-axis T-slot-connecting platform 369 is mounted in the T-slot 361, and the magnetic caliper mounting device 20 is mounted on the platform 369. In all other respects, the steps described above in connection with FIG. 36A are carried out, with the same results.

Figure 37A:
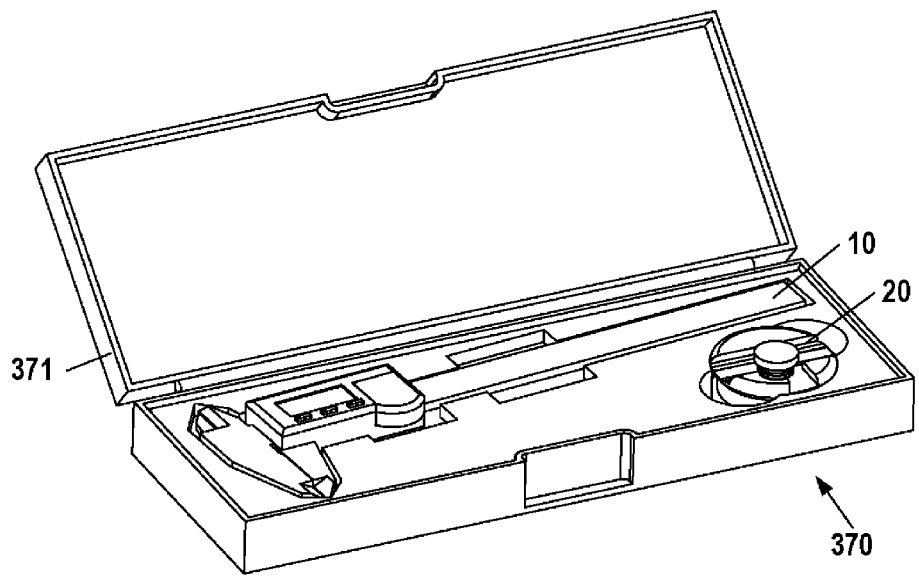
FIGS. 37A-37B are perspective views of one embodiment of a caliper kit comprising a container, a caliper, and the magnetic caliper mounting device of FIGS. 2A-2C.
Figure 37B:
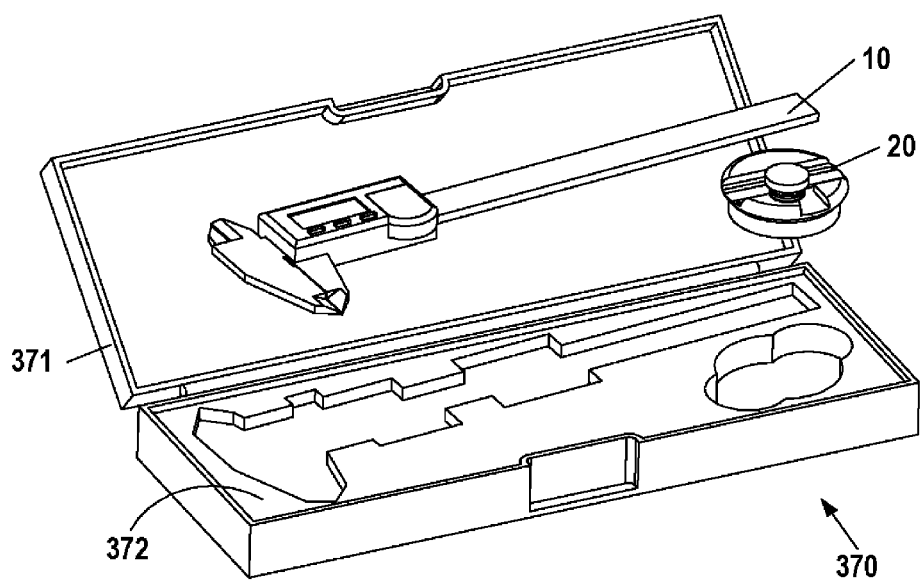

FIGS. 37A & 37B provide perspective and exploded views of a caliper kit 370 comprising a sliding caliper 10 as shown in FIGS. 1A-1B and a magnetic caliper mounting device 20 as described in FIGS. 2A-2C. The sliding caliper 10 has a fixed jaw 15 attached to a scale bar 12 and a movable jaw 16 mounted for sliding along the scale bar 12. The caliper mounting device 20 has a magnet 22 with a flat exposed surface for securing the sliding caliper 10 to a planar metal surface without a clamp or screw, a shallow channel 25 for receiving the scale bar 12 of the caliper 10, and a retainer 30 adapted to releasably secure the scale bar 12 within the channel 25. Channel 25 is about five-eighths of an inch wide and extends longitudinally between opposite edges of the caliper mounting device 20. The kit 370 also includes a part bay or mold 372 for positioning the caliper 10 and magnetic caliper mounting device 20 in the container 371.

Figure 38A:
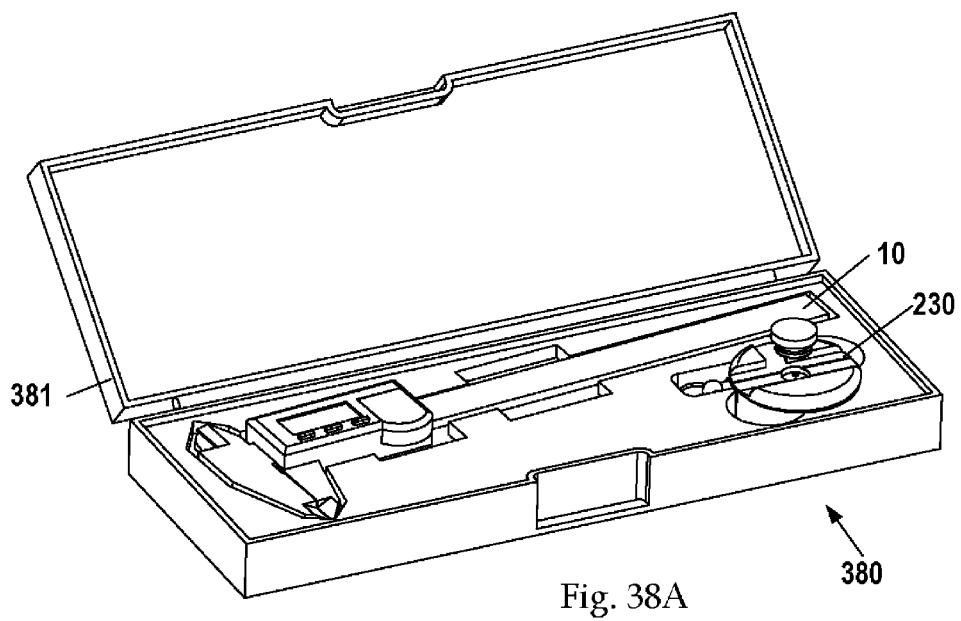
FIGS. 38A-38B are perspective views of another embodiment of a caliper kit comprising a container, a caliper, and the magnetic caliper mounting device of FIG. 23.
Figure 38B:
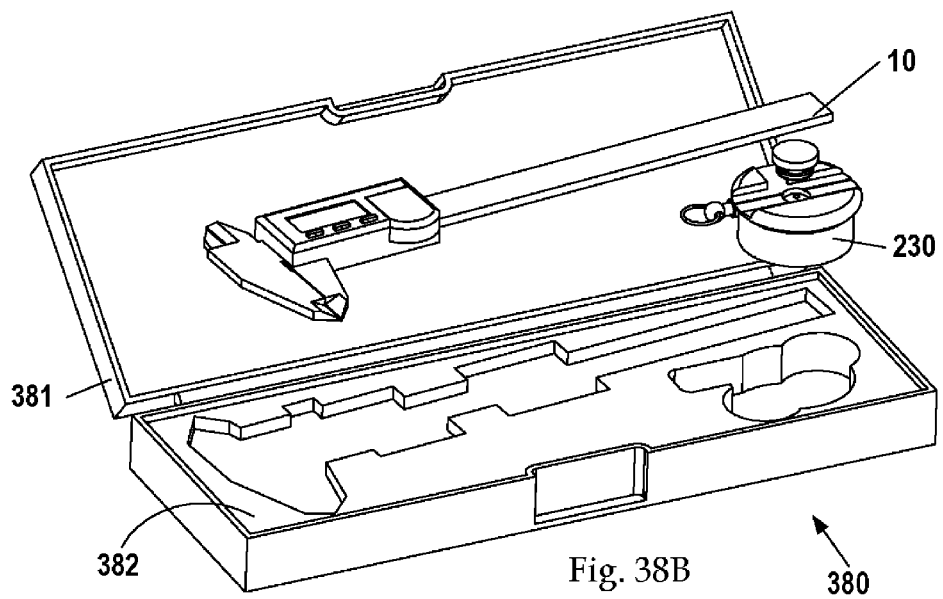

FIGS. 38A & 38B provide perspective and exploded views of another caliper kit 380 comprising a container 381, the sliding caliper 10 of FIGS. 1A-1B, and a magnetic caliper mounting device 230 with an integrated spring-loaded caliper jaw extender 235 as described in FIGS. 23 and 24. The kit 380 also includes a part bay or mold 382 for positioning the caliper 10 and magnetic caliper mounting device 20 in the container 381.

Figure 39A:
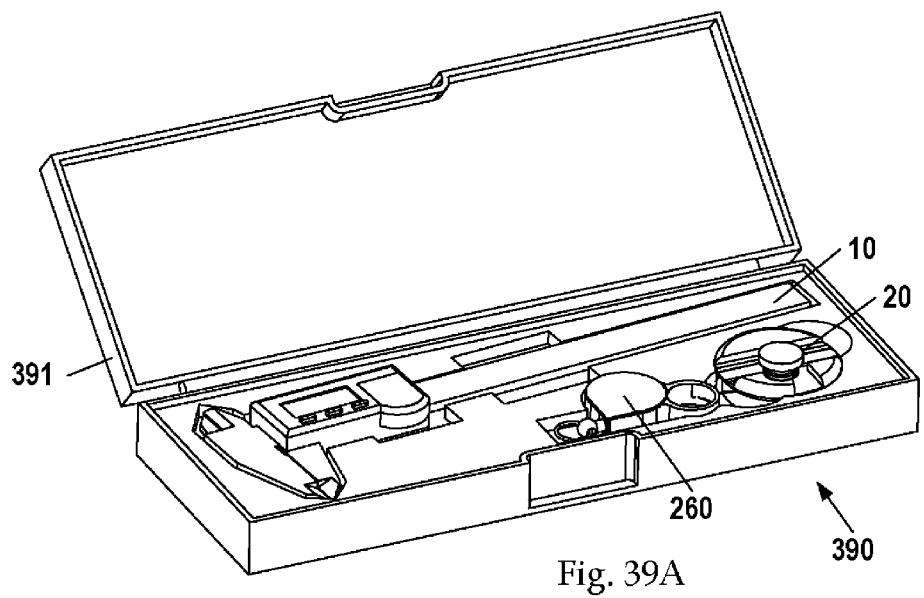
FIGS. 39A-39B are perspective views of another embodiment of a caliper kit comprising a container, a caliper, the magnetic caliper mounting device of FIGS. 2A-2C, and the spring pack accessory of FIG. 26.
Figure 39B:
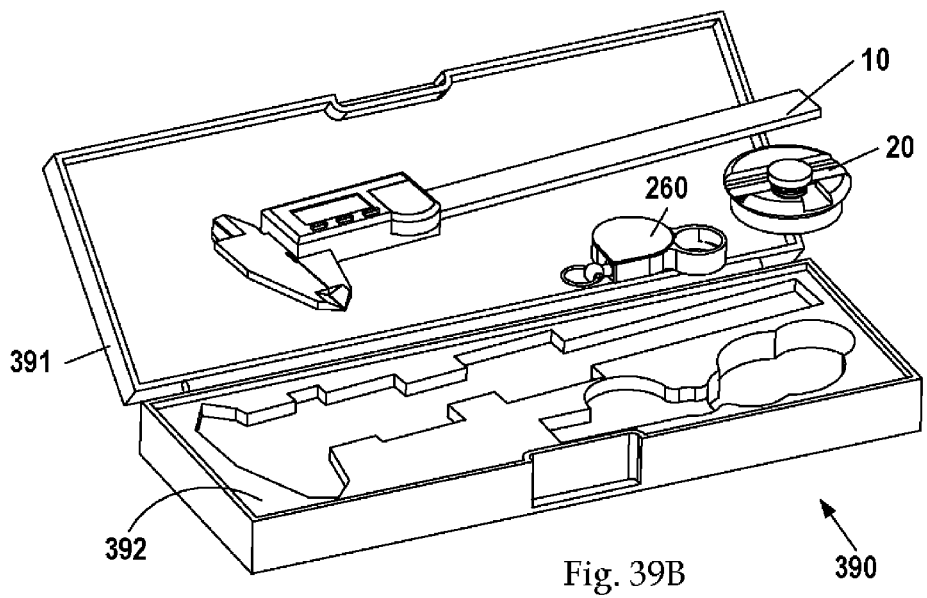

FIGS. 39A-39B provide perspective and exploded views of yet another embodiment of a caliper kit 390 comprising a container 390, a caliper 10, the magnetic caliper mounting device 20 of FIGS. 2A-2C, and the spring pack accessory 260 of FIG. 26. The kit 390 also includes a part bay or mold 392 for positioning the caliper 10 and magnetic caliper mounting device 20 in the container 391.

This invention also contemplates caliper kits that include combinations of a caliper 10 with alternative and additional accessories, such as the caliper mounts 310, 320, and 340 of FIGS. 31, 32A, and 34A, the depth probe stop accessory 350 of FIG. 35A. This invention also contemplates accessory kits that lack a caliper 10 but include any combination of caliper mounting devices and accessories shown and described in this specification.

Having thus described exemplary embodiments of the present invention, it should be noted that the disclosures contained in FIGS. 1A-39B are exemplary only, and that various other alternatives, adaptations, and modifications may be made within the scope of the present invention. Accordingly, the present invention is not limited to the specific embodiments illustrated herein, but is limited only by the following claims.

I claim:

1. An apparatus for mounting a sliding caliper near a planar metal surface, the apparatus adapted to be secured to the planar metal surface without a clamp or a screw, the apparatus comprising:

a caliper mount adapted for mounting a sliding caliper, wherein the caliper has a fixed jaw attached to a scale bar, a movable frame and movable jaw mounted for sliding along the scale bar, and a depth probe mounted within a slot of the scale bar;

the caliper mount having a shallow channel for receiving the scale bar of the caliper, the channel having a width of approximately five-eighths of an inch and extending longitudinally between opposite edges of the caliper mount;

a retainer adapted to releasably secure the scale bar of the caliper within the channel of the caliper mount; and a magnet associated with the caliper mount and having a flat exposed surface operable to secure the apparatus to a planar metal surface.

2. The apparatus of claim 1, further comprising a tapered jaw mounting channel for receiving the movable jaw of a sliding caliper.

3. The apparatus of claim 1, further comprising a groove positioned down the middle of the shallow channel of the caliper mount, and extending longitudinally along the length of said channel, the groove facilitating unhindered movement of the depth probe of a caliper mounted on the caliper mount.

4. The apparatus of claim 1, further comprising a curved recess positioned down the middle of the shallow channel of the caliper mount, and extending longitudinally along the length of said channel, the groove facilitating unhindered movement of the depth probe of a caliper mounted on the caliper mount.

5. The apparatus of claim 1, wherein the retainer comprises a thumb screw that is mounted vertically with respect to the channel of the caliper mount.

6. The apparatus of claim 5, further comprising a washer mounted on a shaft of the thumb screw, the washer adapted to press against a top surface of the scale bar of the caliper, thereby securing the caliper within the channel of the caliper mount.

7. The apparatus of claim 1, wherein the retainer comprises a thumb screw that is mounted horizontally with respect to the caliper mount, the thumb screw being operable to press against a flexible wall of the channel of the caliper mount to cause the flexible wall to press against a side of the scale bar of the caliper.

8. The apparatus of claim 1, wherein the retainer comprises a thumb screw that is mounted horizontally with respect to the caliper mount, the thumb screw having a plastic tip that is operable to protrude through a channel wall of the caliper mount and press against a side of the scale bar of the caliper.

9. The apparatus of claim 1, wherein the retainer comprises a cam mounted to a side of the channel of the caliper mount, the cam being operable to rotate about an axis between a caliper release position and a caliper retaining position.

10. The apparatus of claim 1, wherein the channel is oriented to hold a caliper so that its longitudinal axis is parallel to a planar metal surface to which the apparatus is mounted.

11. The apparatus of claim 1, wherein the channel is oriented to hold a caliper so that its longitudinal axis is perpendicular to a planar metal surface to which the apparatus is mounted.

12. The apparatus of claim 1, wherein the caliper mount comprises a housing for the magnet, a caliper holder containing the channel for receiving the scale bar of the caliper, and a joint that rotatably attaches the caliper holder to the caliper mount, the joint enabling the caliper to rotatably oriented with respect to a planar metal surface to which the apparatus is mounted.

13. The apparatus of claim 1, wherein the caliper mount comprises a housing for the magnet, a caliper holder containing the channel for receiving the scale bar of the caliper, and a joint that attaches the caliper holder to the caliper mount, the joint being operable to position the caliper at any angle with respect to the planar metal surface to which the apparatus is mounted.

14. The apparatus of claim 1, further comprising:
a caliper jaw extender associated with the caliper mount, the caliper jaw extender having a spring-loaded retractor, a retractor connector adapted for connection to the movable frame of the caliper, and a spring with sufficient tension to pull the caliper's movable frame, if unobstructed and connected to the retractor, toward an extended position.

15. The apparatus of claim 14, wherein the caliper jaw extender and caliper mount share a common housing.

16. The apparatus of claim 15, wherein the spring and retractor are part of a spring pack accessory that is physically independent of the caliper mount, the spring pack accessory having a base connector adapted to mount the spring pack accessory on the caliper mount.

17. The apparatus of claim 1, wherein the channel for receiving the scale bar of the caliper has a length of at least approximately one inch.

18. The apparatus of claim 1, wherein the apparatus consists of a single, structurally-integrated unit of hardware with a single mounting surface area for securing the apparatus to a planar metal surface.

19. An apparatus for mounting a sliding caliper comprising:
a caliper mount adapted for mounting a sliding caliper, wherein the caliper has a fixed jaw attached to a scale bar and a movable frame and movable jaw mounted for sliding along the scale bar;
the caliper mount having a shallow channel for receiving the scale bar of the caliper, the channel having a width of approximately five-eighths of an inch and extending longitudinally between opposite edges of the caliper mount;
a retainer adapted to releasably secure the scale bar of the caliper within the channel of the caliper mount; and
a caliper jaw extender associated with the caliper mount, the caliper jaw extender having a spring-loaded retractor, a retractor connector adapted for connection to the movable frame of the caliper, and a spring with sufficient tension to pull the caliper's movable frame, if unobstructed and connected to the retractor, toward an extended position.

20. A caliper kit comprising:
a sliding caliper having a fixed jaw attached to a scale bar and a movable jaw mounted for sliding along the scale bar;
a caliper mount adapted for securing the sliding caliper to a machine for working metal, wood, or plastic;
the caliper mount having a shallow channel for receiving the scale bar of the caliper, the channel having a width of approximately five-eighths of an inch and extending longitudinally between opposite edges of the caliper mount;
a retainer adapted to releasably secure the scale bar of the caliper within the channel of the caliper mount; and
a spring pack accessory having a spring-loaded retractor, a retractor connector adapted for connection to the movable frame of the caliper, and a spring with sufficient tension to pull the caliper's movable frame, if unobstructed and connected to the retractor, toward an extended position.

21. A caliper kit comprising:
a sliding caliper having a fixed jaw attached to a scale bar and a movable jaw mounted for sliding along the scale bar;
a caliper mount adapted for securing the sliding caliper to a machine for working metal, wood, or plastic;
the caliper mount having a shallow channel for receiving the scale bar of the caliper, the channel having a width of approximately five-eighths of an inch and extending longitudinally between opposite edges of the caliper mount; and
a retainer adapted to releasably secure the scale bar of the caliper within the channel of the caliper mount;
wherein the caliper mount further comprises an integral caliper jaw extender having a spring-loaded retractor, a retractor connector adapted for connection to the movable frame of the caliper, and a spring with sufficient tension to pull the caliper's movable frame, if unobstructed and connected to the retractor, toward an extended position.

\* \* \* \* \*